United States Patent
Hayashi

(10) Patent No.: US 10,552,224 B2
(45) Date of Patent: Feb. 4, 2020

(54) COMPUTER SYSTEM INCLUDING SERVER STORAGE SYSTEM

(71) Applicant: Hitachi, Ltd., Tokyo (JP)

(72) Inventor: Shinichi Hayashi, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 187 days.

(21) Appl. No.: 15/552,510

(22) PCT Filed: May 14, 2015

(86) PCT No.: PCT/JP2015/063937
§ 371 (c)(1),
(2) Date: Aug. 22, 2017

(87) PCT Pub. No.: WO2016/181554
PCT Pub. Date: Nov. 17, 2016

(65) Prior Publication Data
US 2018/0052715 A1 Feb. 22, 2018

(51) Int. Cl.
*G06F 9/44* (2018.01)
*G06F 9/50* (2006.01)
(Continued)

(52) U.S. Cl.
CPC ........... *G06F 9/5044* (2013.01); *G06F 9/505* (2013.01); *G06F 9/5077* (2013.01); *H04L 67/1097* (2013.01); *H04L 67/42* (2013.01)

(58) Field of Classification Search
CPC ...... G06F 9/5044; G06F 9/5077; G06F 9/505; G06F 3/067; G06F 3/0665; G06F 3/0604;
(Continued)

(56) References Cited

U.S. PATENT DOCUMENTS

2003/0097393 A1* 5/2003 Kawamoto ........... G06F 9/5077 718/1
2005/0160428 A1 7/2005 Ayachitula et al.
(Continued)

FOREIGN PATENT DOCUMENTS

JP 2003-157177 A 5/2003
JP 2005-209203 A 8/2005
(Continued)

OTHER PUBLICATIONS

International Search Report of PCT/JP2015/063937 dated Jul. 7, 2015.

*Primary Examiner* — Anna C Deng
(74) *Attorney, Agent, or Firm* — Mattingly & Malur, PC

(57) ABSTRACT

A server storage system has a plurality of logical partitions obtained by logically dividing at least part of a plurality of resources including a plurality of types of resource. The plurality of resources include a plurality of server resources including a plurality of types of server resource provided in a server system and a plurality of storage resources including a plurality of types of storage resource provided in a storage system. A resource allocated to each of two or more logical partitions includes at least one of an exclusively allocated resource and a commonly allocated resource. The type of each of a plurality of resources exclusively allocated to each of the two or more logical partitions varies in accordance with a load characteristic of a load on the logical partition.

20 Claims, 15 Drawing Sheets

(51) Int. Cl.
*H04L 29/08* (2006.01)
*H04L 29/06* (2006.01)

(58) Field of Classification Search
CPC ... G06F 9/50; G06F 9/46; H04L 67/42; H04L 67/1097
USPC .......................................................... 717/104
See application file for complete search history.

(56) References Cited

U.S. PATENT DOCUMENTS

| | | |
|---|---|---|
| 2005/0172040 A1 | 8/2005 | Hashimoto |
| 2009/0235249 A1 | 9/2009 | Kobayashi et al. |
| 2010/0079302 A1* | 4/2010 | Eide ...................... G06F 9/5077 340/691.8 |
| 2010/0229171 A1* | 9/2010 | Yoshimura .............. G06F 9/455 718/1 |

FOREIGN PATENT DOCUMENTS

| | | |
|---|---|---|
| JP | 4227035 B2 | 2/2009 |
| JP | 2009-217608 A | 9/2009 |
| JP | 2010-205209 A | 9/2010 |
| WO | 2011/117958 A1 | 9/2011 |

\* cited by examiner

FIG. 3

I/O size table
145

| APP name | APP intended use | VOL intended use | I/O size |
|---|---|---|---|
| APP-a | OLTP | Data | Large |
| APP-a | OLTP | Log | Small |
| APP-a | OLAP | Data | Large |
| APP-b | OLTP | Data | Small |
| APP-b | OLTP | Log | Small |
| APP-b | OLAP | Data | Large |
| ... | ... | ... | ... |

Allocation policy table
146

| I/O size | Server HBA CTL | Server HBA port | Storage HBA port | Storage HBA | Storage CPU | Storage memory | Storage drive |
|---|---|---|---|---|---|---|---|
| Small | Exclusively used | Commonly used | Commonly used by VOLs having same I/O size | Commonly used by VOLs having same I/O size | Exclusively used | Commonly used | Commonly used |
| Large | Exclusively used | Exclusively used | Exclusively used | Commonly used by VOLs having same I/O size | Commonly used | Exclusively used | Commonly used |
| ... | ... | ... | ... | ... | ... | ... | ... |

Integrated LPAR size template table
147

| Integrated LPAR size | Number of LPAR CPU cores | LPAR memory capacity | Number of LPAR NIC ports | I/O size | Number of HBA ports | Number of server HBA CTLs |
|---|---|---|---|---|---|---|
| S | 8 | 128 GB | 1 | Small | 2 | 2 |
|   |   |        |   | Large | 2 | 4 |
| M | 16 | 256 GB | 2 | Small | 4 | 4 |
|   |    |        |   | Large | 4 | 8 |
| L | 32 | 512 GB | 4 | Small | 8 | 8 |
|   |    |        |   | Large | 8 | 16 |
| ... | ... | ... | ... | ... | ... | ... |

FIG. 6

VOL template table
148

| APP name | APP intended use | VOL intended use | Integrated LPAR size | VOL capacity | Number of VOLs |
|---|---|---|---|---|---|
| APP-a | OLTP | Data | S | 128 GB | 4 |
|       |      |      | M | 256 GB | 4 |
|       |      |      | L | 512 GB | 4 |
|       |      | Log  | S | 128 MB | 4 |
|       |      |      | M | 256 MB | 4 |
|       |      |      | L | 512 MB | 4 |
|       | OLAP | Data | S | 512 GB | 4 |
| APP-b | OLTP | Data | S | 128 GB | 4 |
|       |      | Log  | S | 128 MB | 4 |
|       | OLAP | Data | S | 512 GB | 4 |
| ... | ... | ... | ... | ... | ... |

FIG. 7

Integrated LPAR table
149

| Integrated LPAR ID (701) | Environment (702) | APP (703) | APP intended use (704) | Integrated LPAR size (706) |
|---|---|---|---|---|
| LPAR1 | Actual | APP-a | OLTP | L |
| LPAR2 | Actual | APP-a | OLTP | M |
| LPAR3 | Development | APP-a | OLTP | S |
| ... | ... | ... | ... | ... |

FIG. 8

Server LPAR table
150

| LPAR ID (801) | Server ID (802) | Number of CPU cores (803) | Memory capacity (804) | Number of NIC ports (805) | NIC port allocation (806) |
|---|---|---|---|---|---|
| LPAR1 | Server 1 | 32 | 512 GB | 4 | Exclusively used |
| LPAR2 | Server 1 | 16 | 256 GB | 2 | Exclusively used |
| LPAR3 | Server 1 | 8 | 128 GB | 2 | Commonly used |
| ... | ... | ... | ... | ... | ... |

FIG. 9

Server LPAR/HBA table
151

| LPAR ID | Number of HBA ports | HBA port allocation | Number of HBA CTLs | HBA CTL allocation |
|---|---|---|---|---|
| LPAR1 | 8 | Exclusively used | 16 | Exclusively used |
| LPAR2 | 4 | Exclusively used | 8 | Exclusively used |
| LPAR3 | 2 | Commonly used | 2 | Exclusively used |
| ... | ... | ... | ... | ... |

FIG. 10

Server HBA table
152

| Server ID | HBA ID | Port ID | Port allocation | CTL ID | CTL allocation | I/O size | Allocation destination | Environ-ment |
|---|---|---|---|---|---|---|---|---|
| Server 1 | HBA-a | Port-a | Exclusively used | CTL1 | Exclusively used | Large | LPAR1 | Actual |
| Server 1 | HBA-a | Port-a | Exclusively used | CTL2 | Exclusively used | Large | LPAR1 | Actual |
| Server 1 | HBA-a | Port-b | Exclusively used | CTL3 | Exclusively used | Large | LPAR2 | Actual |
| Server 1 | HBA-a | Port-b | Exclusively used | CTL4 | Exclusively used | Large | LPAR2 | Actual |
| Server 1 | HBA-a | Port-c | Commonly used | CTL5 | Exclusively used | Small | LPAR2 | Actual |
| Server 1 | HBA-a | Port-d | Commonly used | CTL6 | Exclusively used | Small | LPAR3 | Actual |
| Server 1 | HBA-b | Port-e | Commonly used | CTL7 | Commonly used | Small | LPAR4, LPAR5 | Development |
| ... | ... | ... | ... | ... | ... | ... | ... | ... |

FIG. 11

Storage HBA table
153

| Storage ID | HBA ID | Port ID | Port allocation | I/O size | Allocation destination | Environment |
|---|---|---|---|---|---|---|
| Storage 1 | HBA1 | Port1 | Exclusively used | Large | LPAR1 | Actual |
| Storage 1 | HBA1 | Port2 | Exclusively used | Large | LPAR2 | Actual |
| Storage 1 | HBA2 | Port3 | Commonly used | Small | LPAR2, LPAR3 | Actual |
| Storage 1 | HBA3 | Port4 | Commonly used | Small | LPAR4, LPAR5 | Development |
| ... | ... | ... | ... | ... | ... | ... |

Server/storage coupling table
154

| Server ID | Server HBA ID | Server port ID | Storage ID | Storage HBA ID | Storage port ID |
|---|---|---|---|---|---|
| Server 1 | HBA-a | Port-a | Storage 1 | HBA1 | Port1 |
| Server 1 | HBA-a | Port-b | Storage 1 | HBA1 | Port2 |
| Server 1 | HBA-a | Port-c | Storage 1 | HBA2 | Port3 |
| Server 1 | HBA-b | Port-d | Storage 1 | HBA3 | Port4 |
| ... | ... | ... | ... | ... | ... |

Storage partition table
155

| Storage partition ID | Environment | HBA | CPU | Memory | Drive |
|---|---|---|---|---|---|
| Storage partition 1 | Actual | HBA1, HBA2 | CPU1, CPU2 | CLPR1, CLPR2 | Drive1-Drive8 |
| Storage partition 2 | Development | HBA3, HBA4 | CPU3 | CLPR3 | Drive9-Drive12 |
| Default storage partition | No allocation | HBA5, HBA6 | CPU4 | CLPR0 | Drive13-Drive16 |
| ... | ... | ... | ... | ... | ... |

Columns: 1301, 1302, 1303, 1304, 1305, 1306

FIG. 14

Storage partition creation screen 142

Storage partition ID _____ —1401

Environment name _____ —1402

Storage partition size                                         1403

| | Size | Number of HBAs | Number of CPUs | Memory capacity | Number of drives |
|---|---|---|---|---|---|
| ● | S | 2 | 1 | 128 GB | 4 |
| ○ | M | 4 | 2 | 256 GB | 8 |
| ○ | L | 8 | 4 | 512 GB | 16 |

1404 — Creation

FIG. 23

Monitoring result screen 2301

Server resource monitoring result

| Server ID | HBA ID | Port ID | Port allocation | CTL ID | CTL allocation | I/O size | Allocation destination | Environment | Use ratio (%) |
|---|---|---|---|---|---|---|---|---|---|
| Server 1 | HBA-a | Port-a | Exclusively used | CTL1 | Exclusively used | Large | LPAR1 | Actual | 10 |
| ... | ... | ... | ... | ... | ... | ... | ... | ... | ... |
| Server 1 | HBA-a | Port-c | Commonly used | CTL5 | Exclusively used | Small | LPAR2 | Actual | 50 |
| Server 1 | HBA-a | Port-d | Commonly used | CTL6 | Exclusively used | Small | LPAR3 | Actual | 60 |
| Server 1 | HBA-b | Port-e | Commonly used | CTL7 | Commonly used | Small | LPAR4, LPAR5 | Development | 40 |
| ... | ... | ... | ... | ... | ... | ... | ... | ... | ... |

Storage resource monitoring result

| Storage ID | HBA ID | Port ID | I/O size | Allocation destination | Environment | Use ratio (%) |
|---|---|---|---|---|---|---|
| Storage 1 | HBA1 | Port1 | Exclusively used | Large | LPAR1 | Actual | 10 |
| ... | ... | ... | ... | ... | ... | ... |
| Storage 1 | HBA3 | Port4 | Commonly used | Small | LPAR4, LPAR5 | Development | 53 |
| ... | ... | ... | ... | ... | ... | ... |

COMPUTER SYSTEM INCLUDING SERVER STORAGE SYSTEM

TECHNICAL FIELD

The present invention generally relates to allocation of resources of a server storage system.

BACKGROUND ART

There is a known server storage system including a server and a storage. There is a need to aggregate a plurality of application programs (APPs) in the server storage system. It is desirable to logically divide resources of the server storage system and execute the plurality of different APPs by using the logically divided different resources so that the performance of any of the APPs does not influence the performance of any of the other APPs. According to Patent Literature 1, resources of a server and a storage system can be logically divided by exclusive allocation of the resources to a plurality of APPs.

CITATION LIST

Patent Literature

[PTL 1] Japanese Patent No. 4,227,035

SUMMARY OF INVENTION

Technical Problem

The logical division of a portion including a server and a storage described above can suppress influence of a logical partition on an adjacent logical partition. However, when resources more than allocated resources are required, a resource exclusively allocated to another logical partition cannot be used. Therefore, when all possible logical allocation is performed as in the related art, the resource use efficiency lowers.

An object of the present application is therefore to achieve both improvement in the degree of aggregation of coexisting application programs and prevention of performance degradation.

Solution to Problem

A computer system includes a server storage system. The server storage system has a plurality of logical partitions obtained by logically dividing at least part of a plurality of resources including a plurality of types of resource. The plurality of resources include a plurality of server resources including a plurality of types of server resource provided in a server system and a plurality of storage resources including a plurality of types of storage resource provided in a storage system. A resource allocated to each of two or more logical partitions includes at least one of an exclusively allocated resource and a commonly allocated resource. A resource exclusively allocated to a logical partition is a resource exclusively used in the logical partition. A resource commonly allocated to a logical partition is a resource that is allowed to be commonly used by at least two logical partitions including the logical partition. The type of each of a plurality of resources exclusively allocated to each of the two or more logical partitions varies in accordance with a load characteristic of a load on the logical partition. The "computer system" used herein may be the server storage system itself or may include the server storage system and a management system that manages the server storage system. The "load characteristic of a load on the logical partition" may be a load characteristic of a load on a resource allocated to the logical partition (for example, CPU or HBA port that will be described later) or may be a load characteristic of a load on a resource provided in the logical partition (for example, VOL that will be described later). The "load characteristic" may be an expected (predicted) load characteristic or may be a load characteristic obtained as an actually measured value. The "resource allocated" to a logical partition is a resource that serves as a component of the logical partition as a result of the allocation. On the other hand, the "resource provided" in a logical partition is a resource used by the logical partition (or an external apparatus (or computer program) that uses the logical partition) (such as resource is typically not handled as a component of the logical partition).

Advantageous Effects of Invention

Improvement in the degree of aggregation of APPs and prevention of performance degradation can both be achieved.

BRIEF DESCRIPTION OF DRAWINGS

FIG. 3 shows an example of the configuration of an I/O size table.
FIG. 4 shows an example of the configuration of an allocation policy table.
FIG. 5 shows an example of the configuration of an integrated LPAR size template table.
FIG. 6 shows an example of the configuration of a VOL template table.
FIG. 7 shows an example of the configuration of an integrated LPAR table.
FIG. 8 shows an example of the configuration of a server LPAR table.
FIG. 9 shows an example of the configuration of a server LPAR/HBA table.
FIG. 10 shows an example of the configuration of a server HBA table.
FIG. 11 shows an example of the configuration of a storage HBA table.
FIG. 12 shows an example of the configuration of a server/storage coupling table.
FIG. 13 shows an example of the configuration of a storage partition table.
FIG. 14 shows an example of the configuration of a storage partition creation screen.

FIG. 23 shows an example of a monitoring result screen according to a third embodiment.

DESCRIPTION OF EMBODIMENTS

Figure 1:
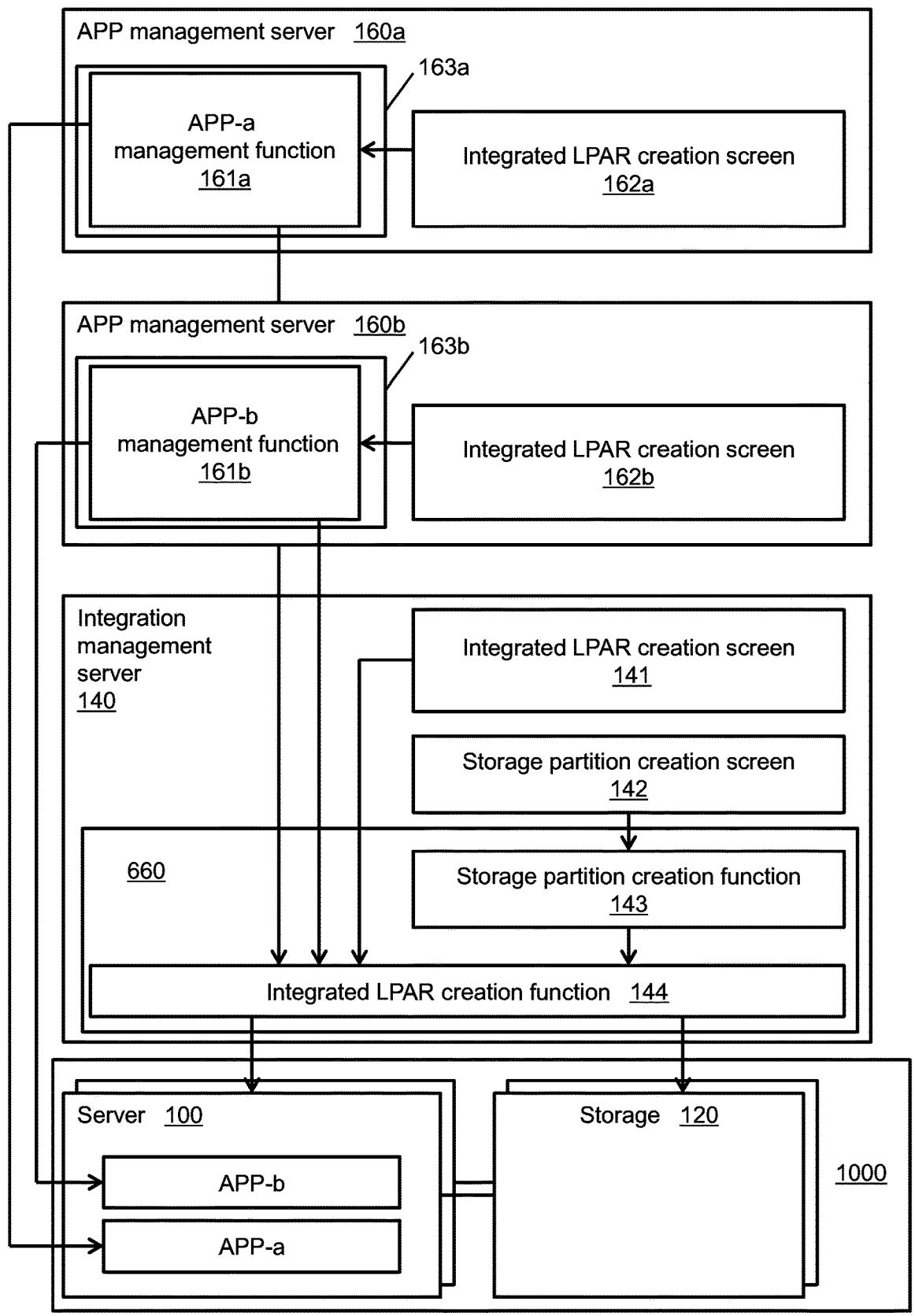
FIG. 1 shows the configuration of a computer system according to a first embodiment.

An embodiment will be described below.

In the following description, information is described in some cases in the form of an "xxx table," but information may be expressed in any data structure. That is, to indicate that information is independent of a data structure, an "xxx table" can be called "xxx information." Further, in the following description, the configuration of each table is presented by way of example; one table may be divided into two or more tables, and entirely or part of two or more tables may be one table.

In the following description, an ID or a name is used as an element identification information. In place of or in addition to an ID or a name, another type of identification information may be used.

In the following description, in a case where elements of the same type are not distinguished from one another in the description, a reference character (or common character in reference character) is used in some cases, and in a case where elements of the same type are distinguished from one another in the description, element identification information (information, such as ID or name assigned to element) (or reference character) is used in some cases.

In the following description, an I/O (input/output) request is a write request or a read request and may be called an access request.

In the following description, a "program" is used as the subject to describe a process in some cases. Since a program, when executed by a processor (CPU (Central Processing Unit), for example), carries out a specified process by using a storage section (memory, for example) and/or an interface device (communication port, for example) and other components as appropriate, the subject of the description of the process may instead be the processor. A process described by using a program as the subject in the description of the process may be taken as a process carried out by the processor or an apparatus or a system including the processor. The processor is an example of a control section and may include a hardware circuit that carries out part or entirety of the process. The program may be installed from a program source onto an apparatus, such as a computer. The program source may, for example, be a storage medium readable by a program distribution server or a computer. In the case where the program source is a program distribution server, the program distribution server may include a processor (CPU, for example) and a storage section, and the storage section may further store a distribution program and a program to be distributed. The processor of the program distribution server may then execute the distribution program to cause the processor of the program distribution server to distribute the program to be distributed to another computer. Further, in the following description, two or more programs may be achieved in the form of one program, and one program may be achieved in the form of two or more programs.

In the following description, a management system may be formed of one or more computers. Specifically, for example, in a case where a management computer displays information (specifically, for example, in a case where the management computer displays information by using a display device of the management computer or a case where the management computer (management server, for example) transmits information to be displayed to a remote computer for display purposes (management client, for example)), the management computer is the management system. Further, for example, in a case where a plurality of computers achieve the identical or similar function of the management computer, the plurality of computers (in a case where a computer for display purposes displays information, the plurality of computers may include the computer for display purposes) are the management system. The management computer (management system, for example), may include the following components: an interface device coupled to an I/O system including a display system; a storage section (memory, for example); and a processor coupled to the interface device and the storage section. The display system may be a display device with which the management computer is provided or a computer for display purposes coupled to the management computer. The I/O system may be an I/O device (keyboard and pointing device, touch panel, for example) with which the management computer is provided or a computer for display purposes or another computer coupled to the management computer. The management computer's "displaying information to be displayed" is causing the display system to display the information to be displayed, which may be the management computer's displaying the information to be displayed on the display device with which the management computer is provided or the management computer's transmitting the information to be displayed to the computer for display purposes (in the latter case, the computer for display purposes displays the information to be displayed). The management computer's inputting/outputting information may be inputting/outputting information from and to the I/O device with which the management computer is provided or inputting/outputting information from and to a remote computer (computer for display purposes, for example) coupled to the management computer. Outputting information may be displaying the information.

In the following description, a "server LPAR" is an LPAR that exclusively uses at least one of a plurality of resources of the server. A "storage partition" is an LPAR that exclusively uses at least one of a plurality of resources of the storage.

In the following description, an "integrated LPAR" is a word for convenience and representing an LPAR to which a resource of the server and a resource of the storage are both allocated. The "integrated LPAR" is an example of a logical partition. That is, an integrated LPAR refers to a unit including logically divided resources of the server and the storage in the system. In the present embodiment, an integrated LPAR typically includes at least part of a server LPAR and at least part of a storage partition. The server resource and the storage resource allocated to an integrated LPAR may each be an exclusively allocated resource or a commonly allocated resource. Specifically, for example, at least one server resource may be exclusively allocated to an integrated LPAR, and at least one storage resource may be exclusively or commonly allocated to the integrated LPAR. Instead, for example, at least one server resource may be commonly allocated to an integrated LPAR, and at least one storage resource may be exclusively or commonly allocated to the integrated LPAR.

In the following description, a "resource" may be a component provided in servers and storages that form a server storage system. The component may be a physical component (for example, CPU, memory, HBA (host bus adapter), port, drive (physical storage device)) and may be a logical component (for example, VOL (logical volume)). Further, any of the following elements present external to the server and the storage may be handled as an example of the "resource:" for example, a relay device present between any set of the servers and the storages (for example, switch having routing function or port extension device having no routing function); a relay device present between any set of the servers; and a relay device present between any set of the storages. Further, a component of such a relay device (for example, port, core (controller)) may also be handled as an example of the "resource."

In the following description, "X is exclusively allocated to Y1" means that X (resource, for example) is allocated to Y1 (first integrated LPAR, for example) but is not allocated to Y2 (second integrated LPAR, for example), which belongs to the same type of Y1 but is another OBJECT. As a result, X is exclusively used by Y1. On the other hand, "X is commonly allocated to Y1" means that X is allocated to Y1 and can also be allocated to Y2. As a result, X is commonly used by Y1 and Y2.

In the following description, an "exclusive resource" is an exclusively allocated resource, and a "common resource" is a commonly allocated resource.

First Embodiment

FIG. 1 shows the configuration of a computer system according to a first embodiment.

The computer system includes a server storage system 1000, an integration management server 140, which manages the server storage system 1000, and one or more APP management servers 160, which manage a plurality of APPs (application programs) 104 aggregated in the server storage system 1000. In the example shown in FIG. 1, the APPs 104 includes an APP-a and an APP-b, and the APP management servers 160 are formed of an APP management server 160*a*, which manages the APP-a, and an APP management server 160*b*, which manages the APP-b.

The server storage system 1000 includes one or more servers 100 and one or more storages 120. The servers 100 form a server system (one or more server apparatus) having a plurality of resources (plurality of types of resources), such as CPUs and memories. The storages 120 form a storage system (one or more storage apparatus) having a plurality of resources (plurality of types of resources), such as CPUs and memories. The servers 100 and the storages 120 may be accommodated in a single enclosure.

The integration management server 140 executes an integration management program 660. When the integration management program 660 is executed, for example, a storage partition creation function 143 and an integrated LPAR creation function 144 are provided. The integrated LPAR creation function 144 provides an integrated LPAR (logical partitioning) creation screen 141. The storage partition creation function 143 provides a storage partition creation screen 142. The screens 141 and 142 are each, for example, a GUI (graphical user interface).

Figure 15:
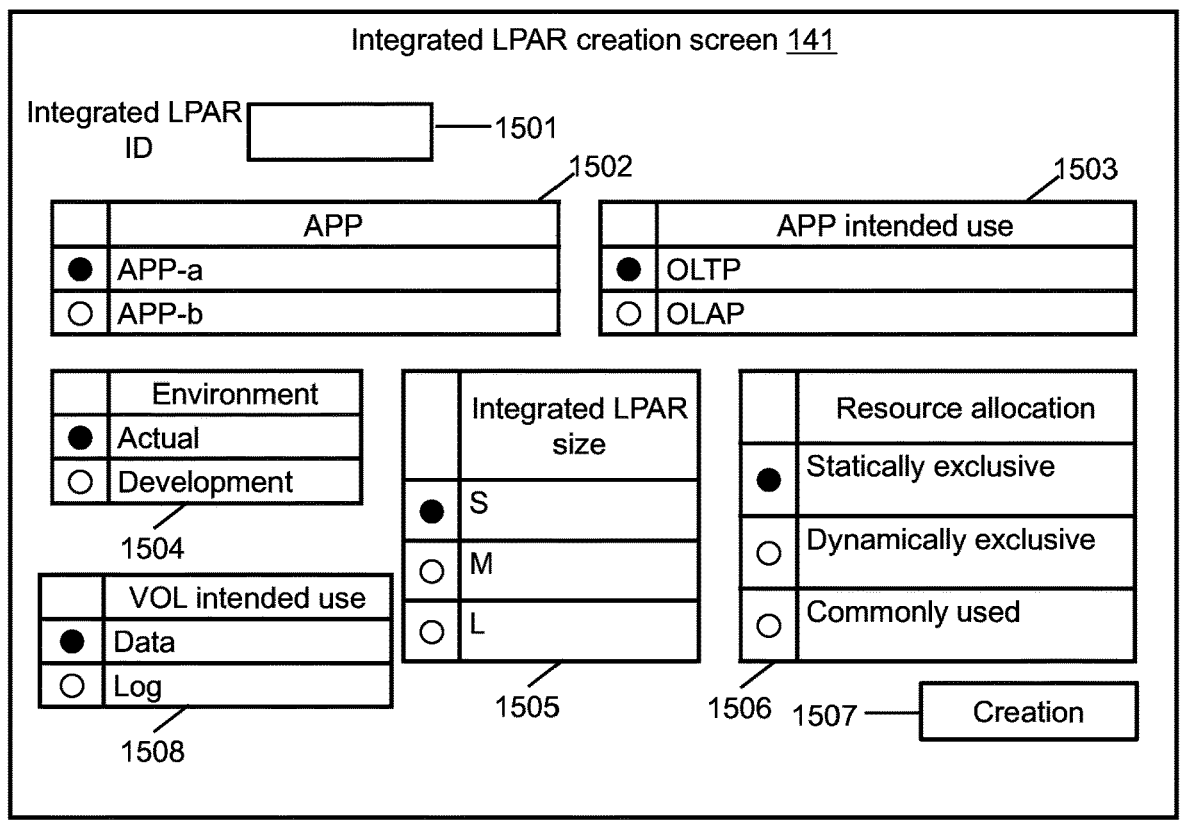
FIG. 15 shows an example of the configuration of an integrated LPAR creation screen.

The integrated LPAR creation screen 141 is a screen for inputting information necessary for creation of an integrated LPAR (FIG. 15). The storage partition creation screen 142 is a screen for inputting information necessary for creation of a storage partition (FIG. 14). The storage partition creation function 143 creates a storage partition on the basis of information inputted via the storage partition creation screen 142. The integrated LPAR creation function 144 creates an integrated LPAR on the basis of information inputted via the integrated LPAR creation screen 141 (or information related to creation instruction from APP management servers 160). The integrated LPAR creation screen 141 is a screen common to a plurality of APPs aggregated in the server storage system 1000.

The APP management servers 160 execute APP management programs 163. When the APP management programs 163 are executed, for example, APP management functions 161 are provided. The APP management functions 161 provide integrated LPAR creation screens 162. Each of the integrated LPAR creation screens 162 is an integrated LPAR creation screen for an APP to be managed by the APP management server 160 that provides the screen 162 and may be the same as the integrated LPAR creation screen 141 in the other points. Each of the APP management functions 161 generates an instruction of creation of an integrated LPAR on the basis of information inputted via the corresponding integrated LPAR creation screen 162. The creation instruction may be related to the information inputted via the screen 162. The APP management function 161 transmits the creation instruction to the integration management server 140.

The APP management servers 160 may be omitted. The instruction of creation of an integrated LPAR may be issued only from the integration management server 140.

Figure 21:
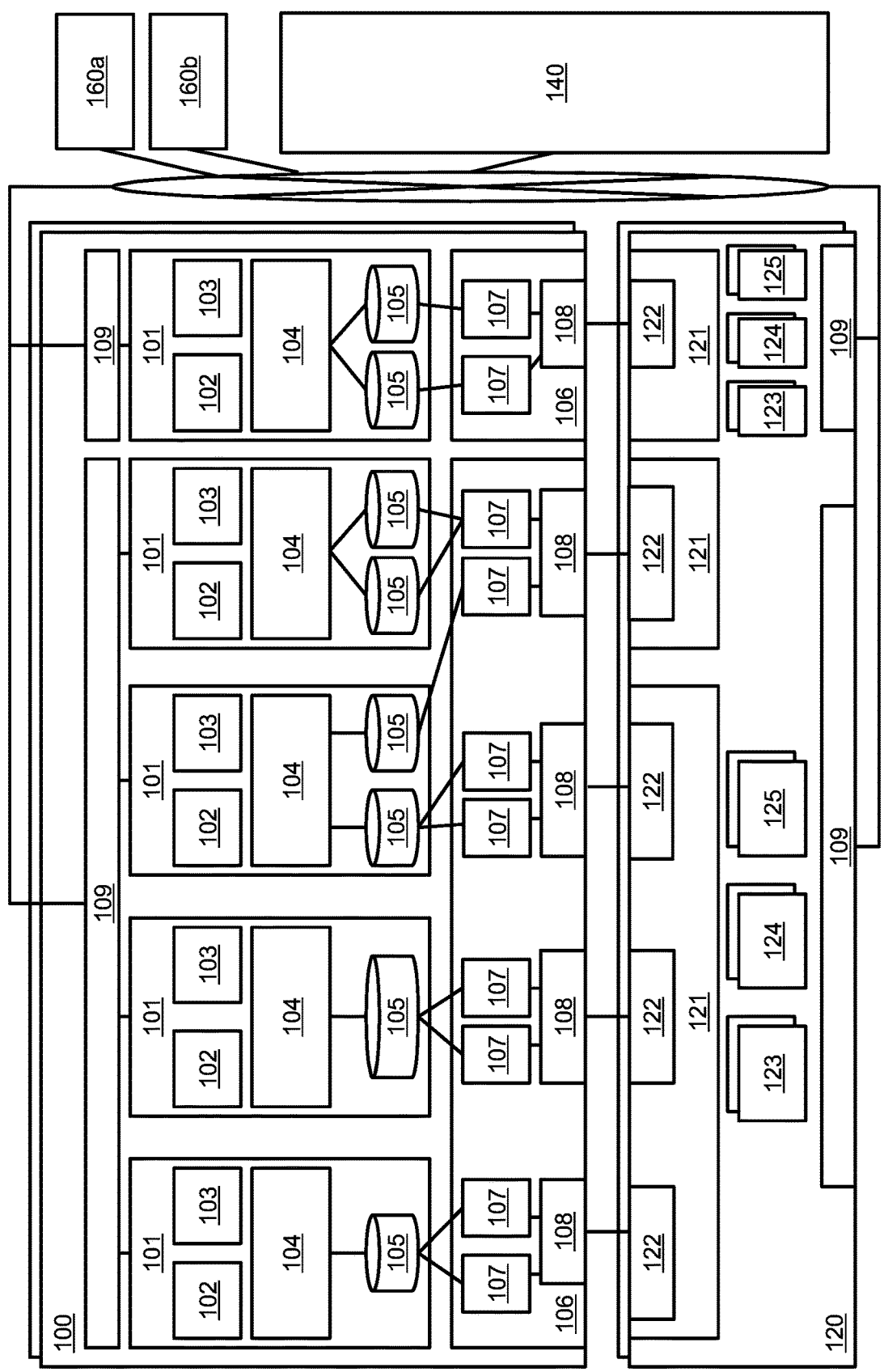
FIG. 21 shows an example of the configuration of the server storage system.

FIG. 21 shows an example of the configuration of the server storage system 1000.

The servers 100, the storages 120, the APP management servers 160, and the integration management server 140 are coupled to a communication network (IP (Internet Protocol) network, for example) 2100. Any of the APP management servers 160 can communicate with the servers 100 in relation to APPs to be managed and transmit an instruction of creation of an integrated LPAR to the integration management server 140 via the communication network 2100. The integration management server 140 can receive an instruction of creation of an integrated LPAR from any of the APP management servers 160, collect information (configuration of each server 100, configuration of each storage 120, and operation status of each resource, for example) from the server storage system 1000, construct a storage partition, and construct an integrated LPAR via the communication network 2100.

The servers 100 each include NICs (Network Interface Cards) 109, CPUs 102, memories 103, and HBAs (Host Bus Adaptors) 106. The servers 100 can communicate with the APP management servers 160 and the integration management server 140 via the NICs 109.

Server LPARs 101 are constructed in each of the servers 100. The server LPARs 101 may each be achieved by executing a hyper-visor that generates a VM (Virtual Machine) and the generated VM or may be the VM itself. The server LPARs 101 each include one or more CPUs 102 (CPU cores) and one or more memories 103, execute at least one APP 104, and recognize at least one VOL (Logical Volume) 105. The APPs 104 may each be a program, such as a database management system and a data analysis program. Each of the APPs 104 can issue an I/O request specifying the VOL 105 recognized by the corresponding server LPAR 101 to input/output data from and to the VOL 105. In FIG. 21, the solid lines between the APPs 104 and the VOLs 105 represent the relationships between the APPs 104 and VOLs 105.

The HBAs 106 are each an interface device for coupling the corresponding server 100 and storage 120 to each other. The HBAs 106 include CTLs (controllers) 107 and ports

108. The CTLs correspond to cores of the HBAs 106 and control transfer of requests and responses via the HBAs 106. In FIG. 21, the solid lines between the VOLs 105, the CTLs 107, and the ports 108 represent the relationships among the VOLs 105, the CTLs 107, and the ports 108. That is, the VOLs 105 and the ports 108 are related to the CTLs 107. Each set of CTLs 107 can transmit and receive I/O requests and data via the port 108 related to the CTLs 107.

In the present embodiment, the resources of each of the servers 100 are the CPU cores, the memories, the ports of the NICs 109, the HBAs 106, the CTLs 107, and the ports 108.

The storages 120 each include HBAs 121, CPUs 123, memories 124, and drives 125.

The HBAs 121 each have ports 122. In FIG. 21, the solid lines between the ports 122 and 108 represent the relationships between the ports 122 and 108. Each of the storages 120 communicates with the corresponding server 100 (server LPARs 101) via each of the ports 122 and the port 108 related to the port 122. For example, in accordance with an I/O request received from a server 100 via any of the ports 122, the corresponding CPU 123 inputs/outputs data from and to the drive 125 identified on the basis of the I/O request. The memories 124 may each have a program executed by the corresponding CPU 123, a cache area that temporarily stores the inputted/outputted data from and to the corresponding drive 125, management information for control of the corresponding storage 120, and other pieces of information. The drives 125 are each a physical storage device, typically, a nonvolatile storage device (auxiliary storage device, for example). The drives 125 may each, for example, be an HDD (Hard Disk Drive) or an SSD (Solid State Drive). A plurality of drives 125 may form a RAID (Redundant Array of Independent (or Inexpensive) Disks) group. The RAID group stores data in accordance with the RAID level related to the RAID group. The RAID group may also be called a parity group. The parity group may, for example, be a RAID group that stores parity.

In the present embodiment, the resources of each of the storages 120 are the HBAs 121, the ports 122, the CPUs 123 (or CPU cores), the memories 124, and the drives 125.

The storages 120 each have a first-type resource that processes a request, such as an I/O request, and a second-type resource that is a resource of a type different from the first-type resource. The first-type resource is at least one of a resource relating to a path along which a request is conveyed and a resource relating to processing of the request, and the first-type resource is, for example, the CTLs 107 in each of the HBAs 106 and the CPUs 123 in each of the storages 120. The second-type resource is, for example, the server HBA ports 108 and the storage HBA ports 122.

The relationship between the first-type resource and the second-type resource is, for example, as follows: That is, in a case where the transfer bandwidth of I/O from and to any of the server LPARs 101 does not change but the frequency of I/O, such as IOPS (I/O Per Second), increases, the load on the first-type resource (ratio of first-type resource to maximum load, for example) becomes greater than the load on the second-type resource. Conversely, in a case where the frequency of I/O from and to any of the server LPARs 101 does not change but the I/O transfer bandwidth increases, the load on the second-type resource becomes greater than the load on the first-type resource.

In the present embodiment, in consideration of the above-mentioned relationship between the first-type resource and the second-type resource, the integration management program 660 causes the types, numbers, and other factors of resources allocated to a plurality of integrated LPARs to differ from one another (in other words, the integration management program 660 causes the configurations of a plurality of integrated LPARs obtained by logically dividing the server storage system 1000 to differ from one another), as will be described later.

In the present embodiment, the resources of each of the servers 100 are the CPUs 102, the memories 103, the NICs 109, the HBAs 106, the CTLs 107, and the HBA ports 108. As the resources of each of the servers 100, at least one of the resources may be replaced with at least one resource of another type. In the present embodiment, since at least a resource of one type out of the CPUs 102 and the memories 103 is always exclusively allocated to each of the server LPARs 101 (in other words, the at least one type of resource is a component of each of the server LPARs 101), whether the resource is exclusively or commonly allocated is not selected.

Further, in the present embodiment, the resources of each of the storages 120 are the HBAs 121, the CPUs 123, the memories 124 (for example, cache memories, in particular), and the drives 125 (for example, RAID group, in particular). As the resources of each of the storages 120, at least one of the resources may be replaced with at least one resource of another type. The resource of another type may, for example, be a pool based on the RAID group. A storage area may be allocated from the pool to a virtual VOL in accordance with Thin Provisioning.

In the present embodiment, the protocol of the communication between the servers 100 and the storages 120 is an FC (Fibre Channel) protocol and may be another protocol (PCI-Express, for example). In a case where another protocol is employed, the HBAs 106 of the servers 100 and the HBAs 121 of the storages 120 may be replaced with interface devices for communication according to the employed protocol. The interface devices each typically have one or more ports. The interface devices may each include a communication controller (control chip, for example) related to the ports. The communication controller can control transmission and reception of data and requests, as the CTLs 107 can.

Figure 2:
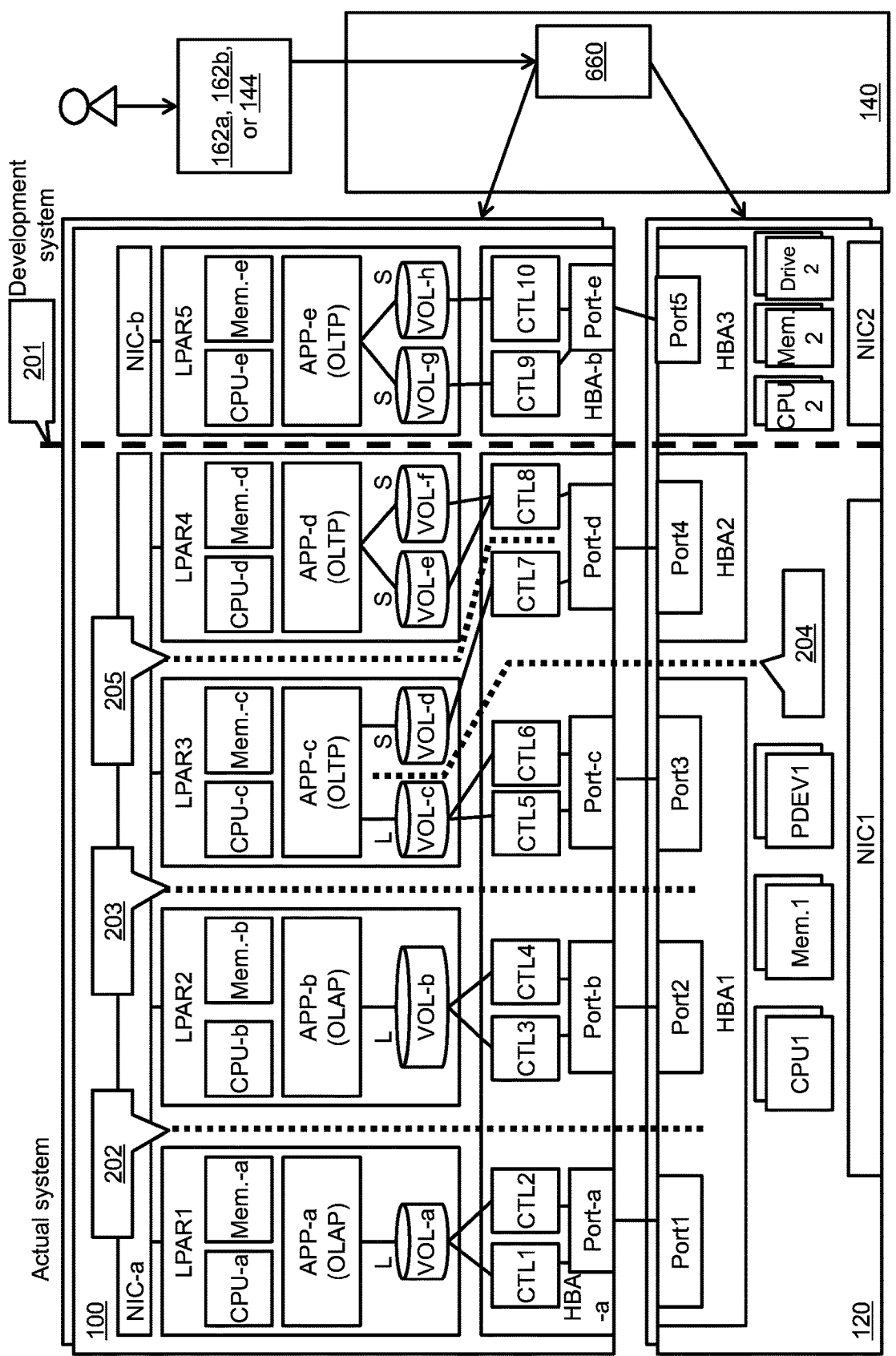
FIG. 2 shows several examples of resource allocation (logical division) in a server storage system.

FIG. 2 shows several examples of resource allocation (logical division) in the server storage system 1000. In FIG. 2, a block representing a resource of the server storage system is labeled with a name or an ID in place of a reference character. Further, in FIG. 2, the letter "L" described in the vicinity of a VOL 105 (VOL-a, for example) means a "large" I/O size, and the letter "S" described in the vicinity of a VOL 105 (VOL-d, for example) means a "small" I/O size.

<1. Preventing Actual System and Development System from Influencing Each Other>

One server storage system 1000 can be used both as an actual system or a development system. The actual system is a system in operation, for example, a system that actually provides a customer with a service on a chargeable basis or at no charge. On the other hand, the development system is a system under development, for example, a system in the course of creation of a configuration for providing a service or a system under test to see whether or not any problem occurs when a service is actually provided.

For example, in general, in the development system, in which tests and other trials are conducted, it is desirable to generate a larger number of server LPARs 101 than in the actual system. On the other hand, in the actual system, it is desirable to achieve both secureness of the performance of the server LPARs 101 and improvement in the degree of aggregation of the APPs 104. Further, in the development system, a large number of I/O actions are produced when a load test and other tests are conducted. It is desirable not to influence the actual system in the course of providing a service even in a case where a large number of I/O actions are produced.

Therefore, in the present embodiment, as indicated by reference character 201, at the boundary between environments in greatly different situations, such as the actual system and the development system, the integration management program 660 logically divides a portion of the server storage system 1000, the portion from the servers 100 to the storages 120, to prevent the two environments from influencing each other. That is, the server storage system 1000 is broadly divided into a first server storage subsystem used as the actual system and a second server storage subsystem used as the development system. In other words, each of the resources of the server storage system 1000 is exclusively allocated to the actual system or the development system. The configuration described above can prevent the development system from influencing the performance of the actual system.

Further, in the present embodiment, the integration management program 660 causes a resource allocation (resource division) policy in the actual system to differ from a resource allocation policy in the development system. It is therefore expected to achieve operation suitable for the characteristics of the actual system and the development system. For example, in the actual system, to achieve both secureness of the performance of the server LPARs 101 and improvement in the degree of aggregation of the APPs 104, whether the resources are exclusively allocated or commonly allocated is determined on the basis of at least one of the type of a resource, the intended use of an APP 104 executed in an LPAR to which the resource is allocated (or LPAR related to the destination to which the resource is allocated), the intended use of the VOL 105 recognized by the server LPAR 101, and the I/O size corresponding to the APP intended use and the VOL intended use. On the other hand, in the development system, to achieve generation of a larger number of server LPARs 101 than in the actual system, resources allocated to the server LPARs 101 in the development system (excluding CPUs 102 and memories 103, which form server LPARs 101, and VOLs 105 recognized by server LPARs 101) are all common resources. For example, in FIG. 2, only the LPAR 5 out of one or more LPARs is shown in the development system, but CTL 9, CTL 10, Port-e, Port 5, HBA 3, CPU 2, Mem. 2, Drive 2, and other components may be commonly allocated to a plurality of LPARs. It is noted that also in the development system, whether a resource is exclusively allocated or commonly allocated may be selected.

In the present embodiment, it is assumed that as the logical division of the portion from the server 100 to the storage 120, at least the server CPU cores, the server memories, the server HBA CTLs, the server HBA ports, the storage HBA ports, the storage HBAs, the storage CPUs, the storage memories, and the storage drives are exclusively allocated to the actual system or the development system. It is, however, noted that depending on the type of a resource, the resource may not be allocated as described above. In this case, part of the resources may be commonly used. Further, the logical division of the portion from the server 100 to the storage 120 is not necessarily the division into the actual system and the development system, and may be division according to another criterion, such as division of the range used by a plurality of customers (tenants).

<2. Resource Allocation in Actual System>

The present embodiment is characterized in that whether a resource is exclusively or commonly used is selected by referring to the characteristics of I/O to be processed in each logical division, for example, the data size (I/O size). In general, a "large" I/O size requires a larger processing load per request than a "small" I/O size because the size of I/O-target data is larger in the former than in the latter. There are different load-intensive resource types in accordance with such a difference in characteristic. Therefore, in the present embodiment, a resource type to be exclusively used is determined in consideration of the characteristics of I/O to be processed. On the other hand, a "small" I/O size tends to require a larger processing load per unit time than a "large" I/O size. The reason for this is that a larger number of requests of I/O each having a "small" I/O size can be issued per unit time than requests of I/O each having a "large" I/O size.

Further, the characteristics of a resource vary on a resource basis. For example, in the case where the I/O transfer bandwidth does not change but the I/O frequency increases, the load on the first-type resource becomes larger than the load on the second-type resource. Further, for example, in the case where the frequency of I/O from and to a logical partition does not change but the I/O transfer bandwidth increases, the load on the second-type resource becomes larger than the load on the first-type resource in some cases.

<2-1. Prevention of Influence Between "Large" I/O Sizes>

At least in the actual system out of the actual system and the development system, whether a variety of resources are exclusively or commonly allocated is selected, as described above. As indicated by reference characters 202 and 203, at least the server HBA ports 108 or the storage HBA ports 122 are not commonly used by a plurality of server LPARs 101 (or APPs 104 or VOLs 105) each related to a "large" I/O size. In other words, a plurality of different server HBA ports 108 and a plurality of different storage HBA ports 122 are allocated (for example, exclusively allocated) to a plurality of server LPARs 101 (or APPs 104 or VOLs 105) each related to a "large" I/O size. Specifically, for example, Port-a and Port 1 are allocated to LPAR 1 (or APP-a or VOL-a) related to a "large" I/O size, and Port-b (server HBA port different from Port-a) and Port 2 (storage HBA port different from Port 1) are allocated to another LPAR, LPAR 2 (or APP-b or VOL-b) related to a "large" I/O size.

In processing of large-size I/O, in particular, since the performance of a port is lower than the performance of the other resources, the bandwidth per port is likely to be a bottleneck. However, even when a load is excessive as compared with the bandwidth per server HBA port and the bandwidth per storage HBA port, the configuration described above prevents the excessive load from influencing the other one of the server HBA port and the storage HBA port related to the "large" and "large" I/O sizes. As a result, an adverse effect between the "large" I/O sizes can be avoided.

A storage HBA 121 may be commonly used by a plurality of VOLs 105 each related to a "large" I/O size. According to the example shown in FIG. 2, the storage HBA 1 is commonly used by VOL-a, VOL-b, and Vol-c (LPAR 1 to LPAR 3), each related to a "large" I/O size. Common use of a storage HBA 121 by a plurality of VOLs 105 each related to a "large" I/O size is defined, for example, in an allocation policy table 146 (see FIG. 4).

Further, the CTLs 107, which are resources having a level higher than the level of the server HBA ports 108, may also be so allocated as not to be commonly used by a plurality of server LPARs 101 (or APPs 104 or VOLs 105) each related to a "large" I/O size. The resources of the server storage system 1000 have a dependent relationship, for example, a tiered topology configuration (no root may be present). Among resources having levels higher than the level a target resource, a resource one-level upper than the target resource can be called a "parent resource," and among resources having levels lower than the level of the target resource, a resource one-level lower than the target resource can be called a "child resource." The concept of the "higher level/lower level" or the "parent/child" can vary in accordance with a parameter to be managed (monitored, for example) but may be defined in accordance with a predetermined criterion. For example, in a case where resources are "coupled" to each other, one of the resources may be a lower-level resource, and the other resource that depends on the one resource (is based on the one resource) may be a higher-level resource. In a case where an "inclusion relationship" is established between resources, one of the resources may be a lower-level resource, and the other resource that includes the one resource may be a higher-level resource.

<2-2. Prevention of Influence Between "Large" I/O Size and "Small" I/O Size>

As indicated by reference character 204, at least the server HBA CTLs 107 or the storage HBAs 121 are not commonly used by server LPARs 101 (or APPs 104 or VOLs 105) each related to a "large" I/O size or server LPARs 101 (or APPs 104 or VOLs 105) each related to a "small" I/O size. In other words, a plurality of different server HBA CTLs 107 and a plurality of different storage HBAs 121 are allocated (for example, exclusively allocated) to server LPARs 101 (or APPs 104 or VOLs 105) each related to a "large" I/O size and server LPARs 101 (or APPs 104 or VOLs 105) each related to a "small" I/O size. Specifically, for example, CTLs 5 and 6 and HBA 1 are allocated to VOL-c related to a "large" I/O size. CTL 7 (server HBA CTL different from CTLs 5 and 6) and HBA 2 (storage HBA different from HBA 1) are allocated to VOL-d related to a "small" I/O size.

In general, a "large" I/O size requires a larger processing load on a CTL per request than a "small" I/O size because the size of I/O-target data is larger in the former than in the latter, as described above. Therefore, allocating different server HBA CTLs 107 and different storage HBAs 121 to server LPARs 101 (or APPs 104 and VOLs 105) related to different I/O sizes can prevent, even when a large load acts on one of resources related to a "large" I/O size and a "small" I/O size, particularly, the resource related to a "large" I/O size, the large load from influencing the server HBA CTLs 107 and different storage HBAs 121 of the other one.

In a case where a storage HBA has an exclusively allocatable CTL (HBA core), as in the case of a server HBL, control may be so performed that allocation on a storage HBA basis may be replaced with allocation on a storage HBA CTL basis to server LPARs 101 (or APPs 104 or VOLs 105) each related to a "large" I/O size and server LPARs 101 (or APPs 104 or VOLs 105) each related to a "small" I/O size.

<2-3. Prevention of Influence Between "Small" I/O Sizes>

As indicated by reference character 205, at least the server HBAs 107 are not commonly used by a plurality of server LPARs 101 (or APPs 104 or VOLs 105) each related to a "small" I/O size. In other words, a plurality of different server HBA CTLs 107 are allocated (for example, exclusively allocated) to a plurality of server LPARs 101 (or APPs 104 or VOLs 105) each related to a "small" I/O size. Specifically, for example, CTL 7 is allocated to LPAR 3 (or APP-c or VOL-d) related to a "small" I/O size, and CTL 8 (server HBA CTL different from CTL 7) is allocated to another LPAR, LPAR 4 (or APP-d or VOL-e/VOL-f) related to a "small" I/O size.

In a case where the I/O size is small, the number of I/O actions to be processed per unit time tends to increase, and a load on a HAB CTL therefore increases. When the HBA CTLs are exclusively used by the server LPARs as described above, even if an excessive load acts on one of server HBA CTLs related to "small" and "small" I/O sizes, the excessive load does not influence the other one of the server HBA CTLs related to the "small" and "small" I/O sizes. As a result, no adverse effect between the "small" I/O sizes occurs.

A storage HBA 121 and a storage HBA port 122 may be commonly used by a plurality of VOLs 105 each related to a "small" I/O size. According to the example shown in FIG. 2, the storage HBA 2 and Port 4 are commonly used by VOL-d, the VOL-e, and the VOL-f each related to a "small" I/O size. Common use of a storage HBA 121 and a storage HBA port 122 by a plurality of VOLs 105 each related to a "small" I/O size is defined, for example, in the allocation policy table 146 (see FIG. 4).

In other words, between "small" I/O sizes, it is unnecessary to use different server HBA ports and storage HBA ports (cause them to be exclusively allocated, for example). The reason for this is that in the case where the I/O size is small, the CPU 123 of a storage 120 becomes a bottleneck of the I/O performance before the port of the storage 120 becomes the bottleneck.

Several examples of the resource allocation performed from the viewpoint of the I/O size have been described.

The resource allocation may be performed on the basis of, in place of the I/O size, at least one of another type of I/O characteristic, such as the number of I/O actions and variation in the number of I/O actions, intended use of an APP, and intended use of a VOL. For example, for an APP with a large number of I/O actions, a drive may be exclusively allocated.

The resource allocation described above is performed by the integration management program 660 stored in the integration management server 140 on the basis of management information stored in the integration management server 140. The integration management server 140 will be described in detail.

Figure 22:
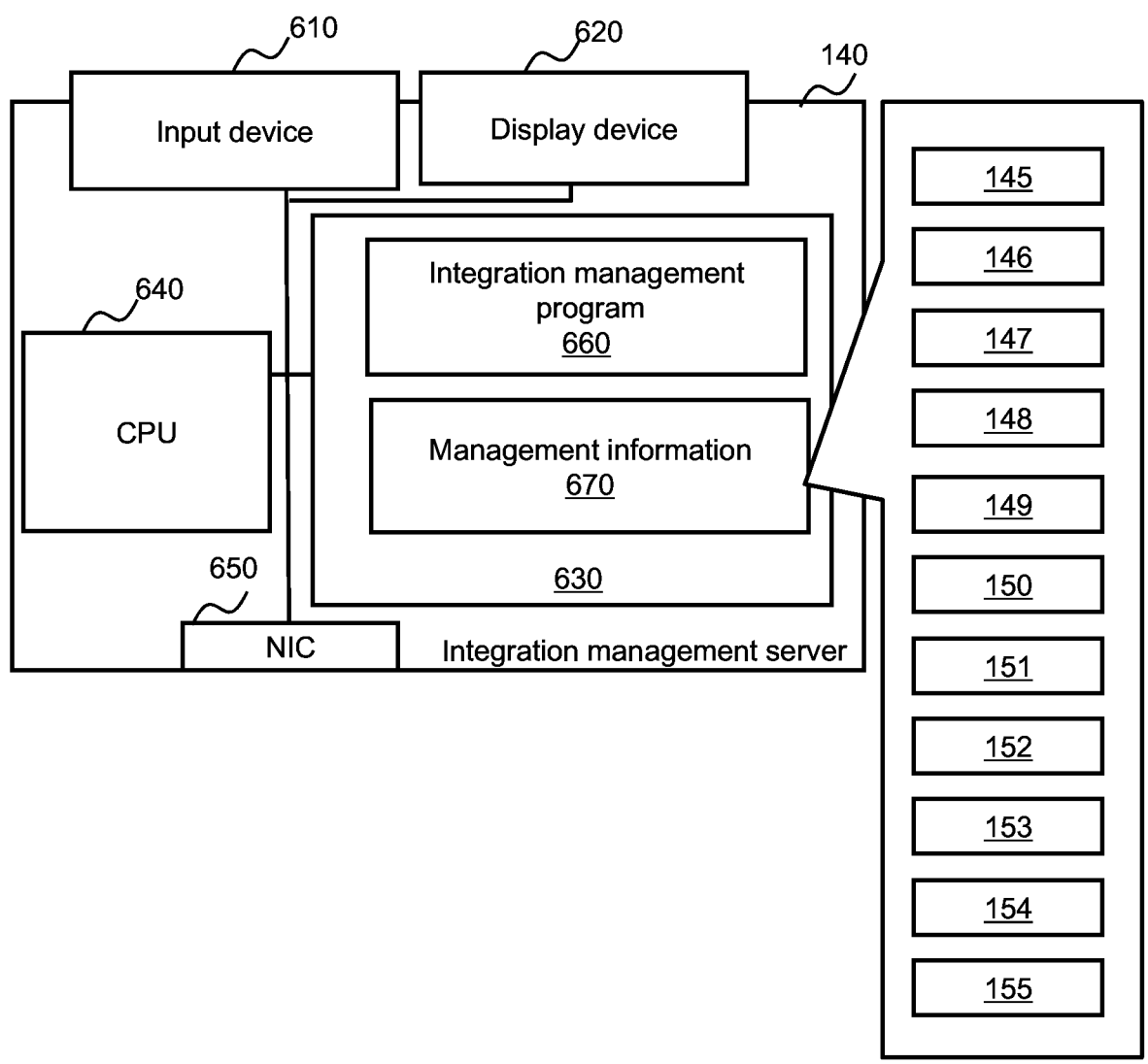
FIG. 22 shows an example of the configuration of an integration management server.

FIG. 22 shows an example of the configuration of the integration management server 140.

The integration management server 140 includes an input device (keyboard and pointing device, for example) 610, a display device 620, an NIC 650, a storage section (memory, for example) 630, which stores a computer program and information, and a CPU 640, which is coupled to the components described above. The input device 610 and the display device 620 may be integrated with each other as in the case of a touch panel. The integration management server 140 may be coupled to, in place of the input device 610 and the display device 620, a computer for display purposes (personal computer operated by system manager, for example) including an input device and a display device. The computer program stored by the storage section 630 is, for example, the integration management program 660, which is executed by the CPU 640. The information stored by the storage section 630 is, for example, management information 670. The management information 670 is information referred to or updated for management of the server storage system 1000 and contains information referred to for creation of an integrated LPAR (determination of configuration of integrated LPAR, for example). Specifically, for example, the management information 670 contains an I/O size table 145 (FIG. 3), an allocation policy table 146 (FIG. 4), an integrated LPAR size template table 147 (FIG. 5), a VOL template table 148 (FIG. 6), an integrated LPAR table 149 (FIG. 7), a server LPAR table 150 (FIG. 8), a server LPAR/HBA table 151 (FIG. 9), a server HBA table 152 (FIG. 10), a storage HBA table 153 (FIG. 11), a server/storage coupling table 154 (FIG. 12), and a storage partition table 155 (FIG. 13).

Each of the tables contained in the management information 670 will be described below.

FIG. 3 shows an example of the configuration of the I/O size table 145.

The I/O size table 145 shows the relationship of an APP name, APP intended use, and VOL intended use with the I/O size. The I/O size is an I/O-target data size (average size, for example) that accompanies an I/O request (I/O request specifying VOL 105) from an APP 104. The I/O size is an example of the I/O characteristic of at least one of the APP 104 and the VOL 105. As an I/O characteristic considered for creation of an integrated LPAR, in place of or in addition to the I/O size, at least one of the following parameters can be employed: a read/write ratio (ratio between the number of read requests and the number of write requests); a sequential/random ratio (ratio between the number of sequential I/O actions and the number of random I/O actions); and locality (which is larger, the number of concentrated I/O actions, in which I/O actions are concentrated in a continuous address range, and the number of distributed I/O actions, which are I/O actions in distributed address ranges). In a case where the combination of the I/O size and any of the above-mentioned types of I/O characteristic excluding the I/O size is considered in creation of an integrated LPAR, the integration management program 660 can place higher priority on the I/O size than the other types of I/O characteristic.

The I/O size table 145 has an entry for each APP 104. Information stored in each entry includes an APP name (or another type of APP identification information for identifying APP) 301, an APP intended use 302, a VOL intended use 303, and an I/O size 304. The APP name 301 represents the name of an APP 104. The APP intended use 302 represents the intended use of the APP 104. The VOL intended use 303 represents the intended use of the VOL 105 related to the APP 104. The I/O size 304 represents an I/O size that is the size of I/O-target data from the APP 104 to the VOL 105.

In the present embodiment, as the APP intended use, OLTP (Online Transaction Processing) or OLAP (Online Analytical Processing) is employed. As the APP intended use, another type of intended use may be employed.

Further, in the present embodiment, as the VOL intended use, data storage or log storage is employed. As the VOL intended use, another type of intended use may be employed.

Further, in the present embodiment, as the value of the I/O size 304, "large" that means the I/O size is relatively large (equal to or larger than a predetermined threshold, for example) or "small" that means the I/O size is relatively small (smaller than the predetermined threshold, for example) is employed. The value of the I/O size 304 may be classified into more levels than the two levels, large and small, (three levels, large, middle, and small, for example) may instead be employed. According to the I/O size table 145, the value of the I/O size 304 is determined by the combination of the APP name 301, the APP intended use 302, and the VOL intended use 303.

FIG. 4 shows an example of the configuration of the allocation policy table 146.

The allocation policy table 146 shows policies of the resource allocation according to the I/O size. The allocation policy table 146 has an entry for each allocation policy. Information stored in each entry includes an I/O size 401, a server HBA CTL 402, a server HBA port 403, a storage HBA port 404, a storage HBA 405, a storage CPU 406, a storage memory 407, and a storage drive 408.

The I/O size 401 represents the I/O size. The server HBA CTL 402 represents a method for allocating a CTL 107. The server HBA port 403 represents a method for allocating a port 108. The storage HBA port 404 represents a method for allocating a port 122. The storage HBA 405 represents a method for allocating an HBA 121. The storage CPU 406 represents a method for allocating a CPU 123. The storage memory 407 represents a method for allocating a memory 124. The storage drive 408 represents a method for allocating a drive 125.

In the allocation policy table 146, the term "Exclusive" means that a resource is exclusively allocated. The term "Common" means that a resource is commonly allocated. The phrase "Commonly used between VOLs related to the same I/O size" means that a resource is commonly allocated to a plurality of VOLs related to the same I/O size (in other words, a resource is so allocated as not to be commonly used by a plurality of VOLs related to different I/O sizes).

In the case where the I/O size is "large," the ports 108 of a server HBA 106 and the ports 122 of a storage HBA 121 are each likely to be a bottleneck. According to the allocation policy table 146, the CTLs 107 of a server HBA 106, the ports 108 of the server HBA 106, and the ports 122 of a storage HBA 121 are exclusively allocated to a VOL related to a "large" I/O size.

On the other hand, in the case where the I/O size is "small," the ports 108 of a server HBA 106 and the ports 122 of a storage HBA 121 are each unlikely to be a bottleneck. When the CTLs 107 of a server HBA 106 are commonly used resources, however, the CTLs 107 are influenced by another load that commonly uses the ports 108 of the server HBA 106. According to the allocation policy table 146, the ports 108 of a server HBA 106 and the ports 122 of a storage HBA 121 are commonly allocated to VOLs each related to a "small" I/O size, and the CTLs 107 of a server HBA 106 are exclusively allocated to the VOLs.

In the present embodiment, the CTLs (not shown) of a storage HBA 121 cannot be controlled. The CTLs of a storage HBA 121 are therefore commonly used. In the case where the CTLs of a storage HBA 121 is commonly used, a load having a "small" I/O size can be greatly influenced by a load having a "large" I/O size. It is therefore desirable to logically divide a storage HBA 121. Therefore, according to the allocation policy table 146, a storage HBA 121 is commonly allocated to a plurality of VOLs related to the same I/O size.

In a case where the CTLs of a storage HBA 121 can be exclusively allocated, the allocation policy table 146 may not be so configured that the storage HBA 121 is logically divided. Further, in a case where the CTLs 107 of a server HBA 106 cannot be exclusively allocated, the allocation policy table 146 may be so configured that the storage HBA 106 is logically divided.

FIG. 5 shows an example of the configuration of the integrated LPAR size template table 147.

The integrated LPAR size template table 147 shows the amount of server resource allocated to an integrated LPAR. The integrated LPAR size template table 147 has an entry for each integrated LPAR size template. Information stored in each entry includes an integrated LPAR size 501, the number of LPAR CPU cores 502, LPAR memory capacity 503, the number of LPAR NIC ports 504, an I/O size 505, the number of HBA ports 506, and the number of server HBA CTLs 507.

The integrated LPAR size 501 represents the size of an integrated LPAR. The value of the integrated LPAR size 501 is classified into three types, large, medium, and small (L/M/S), but the value may instead be classified into two or four or more types. The number of LPAR CPU cores 502 represents the number of CPU cores (the number of cores of CPUs 102) allocated to a server LPAR 101. The LPAR memory capacity 503 represents the capacity of a memory 103 allocated to a server LPAR 101. The number of LPAR NIC ports 504 represents the number of NIC ports (ports of NICs 109) allocated to a server LPAR 101. The I/O size 505 represents the I/O size corresponding to the APP 104 and the VOL 105 in a server LPAR 101. The number of HBA ports 506 represents the number of HBA ports 108 related to a server LPAR 101. The number of server HBA CTLs 507 represents the number of CTLs 107 related to a server LPAR 101.

FIG. 6 shows an example of the configuration of the VOL template table 148.

The VOL template table 148 shows the relationship of the APP name, the APP intended use, the VOL intended use, and the integrated LPAR size with the VOL capacity and the number of VOLs. The VOL template table 148 has an entry for each VOL template. Information stored in each entry includes an APP name 601, an APP intended use 602, a VOL intended use 603, an integrated LPAR size 604, a VOL capacity 605, and the number of VOLs 606. The APP name 601, the APP intended use 602, the VOL intended use 603, and the integrated LPAR size 604 are the same as those described above. The VOL capacity 605 represents the capacity of a VOL 105. The number of VOLs 606 represents the number of VOLs 105.

FIG. 7 shows an example of the configuration of the integrated LPAR table 149.

The integrated LPAR table 149 shows information on an integrated LPAR. The integrated LPAR table 149 has an entry for each integrated LPAR. Information stored in each entry includes an integrated LPAR ID 701, an environment 702, an APP name 703, an APP intended use 704, and an integrated LPAR size 706.

The integrated LPAR ID 701 represents the ID of an integrated LPAR. The value of the ID of an integrated LPAR may be equal to the value of the ID of the server LPAR contained in the integrated LPAR. The environment 702 represents an LPAR environment (actual environment or development environment) that is the environment in which an integrated LPAR is relocated. The APP name 703 represents the name of an APP executed in an integrated LPAR. The APP intended use 704 represents the intended use of an executed APP. The integrated LPAR size 706 represents the size of an integrated LPAR.

FIG. 8 shows an example of the configuration of the server LPAR table 150.

The server LPAR table 150 represents the configuration of a server LPAR 101. The server LPAR table 150 has an entry for each server LPAR 101. Information stored in each entry includes an LPAR ID 801, a server ID 802, the number of CPU cores 803, memory capacity 804, the number of NIC ports 805, and NIC port allocation 806.

The LPAR ID 801 represents the ID of a server LPAR 101. The server ID 802 represents the ID of the server 100 in which a server LPAR 101 operates. The number of CPU cores 803 represents the number of cores of the CPUs 102 allocated to a server LPAR 101. The memory capacity 804 represents the capacity of the memory 103 allocated to a server LPAR 101. The number of NIC ports 805 represents the number of ports of the NICs 109 allocated to a server LPAR 101. The NIC port allocation 806 represents whether the port of an NIC 109 is exclusively or commonly allocated to a server LPAR 101.

FIG. 9 shows an example of the configuration of the server LPAR/HBA table 151.

The server LPAR/HBA table 151 shows the relationship between a server LPAR 101 and a server HBA 106. The server LPAR/HBA table 151 has an entry for each server LPAR 101. Information stored in each entry includes an LPAR ID 901, the number of HBA ports 902, HBA port allocation 903, the number of HBA CTLs 904, and HBA CTL allocation 905.

The LPAR ID 901 represents the ID of a server LPAR 101 in a server 100. The number of HBA ports 902 represents the number of server HBA ports 108 allocated to a server LPAR 101. The HBA port allocation 903 represents the state of allocation of a port 108 (exclusive allocation or common allocation). The number of HBA CTLs 904 represents the number of CTLs 107 allocated to a server LPAR 101. The HBA CTL allocation 905 represents the state of allocation of a CTL 107 (exclusive allocation or common allocation).

FIG. 10 shows an example of the configuration of the server HBA table 152.

The server HBA table 152 is information on a server HBA 106. The server HBA table 152 has an entry for each server HBA CTL 107. Information stored in each entry includes a server ID 1001, an HBA ID 1002, a port ID 1003, port allocation 1004, a CTL ID 1005, CTL allocation 1006, an I/O size 1007, an allocation destination 1008, and an environment 1009.

The server ID 1001 represents the ID of a server 100. The HBA ID 1002 represents the ID of an HBA 106. The port ID 1003 represents the ID of a port 108. The port allocation 1004 represents the state of allocation of a port 108 (exclusive allocation, common allocation, or no allocation). The CTL ID 1005 represents the ID of a CTL 107. The CTL allocation 1006 represents the state of allocation of a CTL 107 (exclusive allocation, common allocation, or no allocation). The I/O size 1007 represents the I/O size of a VOL 105 related to a CTL 107. The allocation destination 1008 represents the ID of a server LPAR 101 to which a CTL 107 is allocated (when no allocation destination is present, "no allocation" may be configured). The environment 1009 represents the environment (actual or development environment) to which an HBA 106 belongs.

FIG. 11 shows an example of the configuration of the storage HBA table 153.

The storage HBA table 153 is information on a storage HBA 121. The storage HBA table 153 has an entry for each storage HBA port 122. Information stored in each entry includes a storage ID 1101, an HBA ID 1102, a port ID 1103, port allocation 1104, an I/O size 1105, an allocation destination 1106, and an environment 1107.

The storage ID 1101 represents the ID of a storage 120. The HBA ID 1102 represents the ID of an HBA 121. The port ID 1103 represents the ID of a port 122. The port allocation 1104 represents the state of allocation of a port 122 (exclusive allocation, common allocation, or no allocation). The I/O size 1105 represents the I/O size of a VOL 105 related to an HBA 121. The allocation destination 1106 represents the ID of a server LPAR 101 to which a port 122 is allocated (when no allocation destination is present, "no allocation" may be configured). The environment 1107 represents the environment (actual or development environment) to which an HBA 121 belongs.

Control is so performed that different I/O sizes are not related to one storage HBA 121. For example, in a case where any one of the ports 122 (first port 122) of an HBA 121 is allocated to a server LPAR 101 (or APP 104 or VOL 105), the I/O size ("large" or "small") corresponding to the server LPAR 101 (or APP 104 or VOL 105) to which the first port 122 is allocated may be configured as the I/O size 1105 for each of the first port 122 and all other ports 122 of the HBA 121 having the first port 122. Instead, for example, in the case where the first port 122 of the HBA 121 is allocated to a server LPAR 101 (or APP 104 or VOL 105), a situation in which the I/O size ("large" or "small") corresponding to the server LPAR 101 (or APP 104 or VOL 105) to which the first port 122 is allocated is be configured as the I/O size 1105 for the first port 122 and the integration management program 660 then relates the server LPARs 101 (or APPs 104 or VOLs 105) related to the other I/O size to all other ports 122 of the HBA 121 having the first port 122 may be avoided. In a case where all ports 122 of a single HBA 121 are "not allocated," either of the I/O sizes can be related to the HBA 121.

FIG. 12 shows an example of the configuration of the server/storage coupling table 154.

The server/storage coupling table 154 shows the coupling relationship between a server HBA port 108 and a storage HBA port 122. The server/storage coupling table 154 has an entry for each combination of a server HBA port 108 and a storage HBA port 122. Information stored in each entry includes a server ID 1201, a server HBA ID 1202, a server port ID 1203, a storage ID 1204, a storage HBA ID 1205, and a storage port ID 1206.

The server ID 1201 represents the ID of a server 100. The server HBA ID 1202 represents the ID of a server HBA 106. The server port ID 1203 represents the ID of a server HBA port 108. The storage ID 1204 represents the ID of a storage 120. The storage HBA ID 1205 represents the ID of a storage HBA 121. The storage port ID 1206 represents the ID of a storage HBA port 122. The server/storage coupling table 154 may be constructed by collection of coupling information from a server 100 and a storage 120.

FIG. 13 shows an example of the configuration of the storage partition table 155.

The storage partition table 155 is information on the configuration of a storage partition. The storage partition table 155 has an entry for each storage partition. Information stored in each entry includes a storage partition ID 1301, an environment 1302, an HBA 1303, a CPU 1304, a memory 1305, and a drive 1306.

The storage partition ID 1301 represents the ID of a storage partition. The environment 1302 represents the environment (actual or development environment) to which a storage partition belongs. The HBA 1303 represents the ID of an HBA 121 that belongs to a storage partition. The CPU 1304 represents the ID of a CPU 123 that belongs to a storage partition. The memory 1305 represents the ID of a CLPR (Cache Logical Partition) that belongs to a storage partition. The CLPR is a cache memory LPAR obtained by logical division of a memory 124 (cache memory). The drive 1306 represents the ID of a drive 125 that belongs to a storage partition.

The tables contained in the management information 670 have been described above.

The storage partition creation screen 142 and the integrated LPAR creation screen 141 will next be described.

FIG. 14 shows an example of the configuration of the storage partition creation screen 142.

The storage partition creation screen 142 is a screen (GUI, for example) that accepts an input of information for creating a storage partition and an instruction of creation of the storage partition. For example, on the storage partition creation screen 142 are displayed a storage partition ID input UI (user interface) 1401, an environment name input UI 1402, a storage partition size selection UI 1403, and a creation instruction UI 1404.

The UI 1401 is a UI to which the ID of a storage partition to be created is inputted and is, for example, a text input field. The UI 1402 is a UI to which the name of the environment (actual or development environment) to which the storage partition to be created belongs is inputted and is, for example, a text input field.

The UI 1403 is a UI that accepts selection of a storage partition size and is formed, for example, of a plurality of radio buttons corresponding to a plurality of storage partition sizes. Specifically, for example, the UI 1403 includes a table showing the relationship of the storage partition size with the number of storage HBAs 121, the number of CPUs 123, the capacity of the memory 124, and the number of drivers 125. The table may be the information itself contained in the management information 670 or information determined by the integration management program 660 on the basis of the information and policies contained in the management information 670. A radio button for each storage partition size is displayed in the table provided in the UI 1403.

Information is inputted to the UIs 1401 and 1402, a storage partition desired by the system manager is selected via the UI 1403, and the creation instruction UI 1404 is operated ("creation" button is pressed, for example). A storage partition is thus created.

FIG. 15 shows an example of the configuration of the integrated LPAR creation screen 141.

The integrated LPAR creation screen 141 is a screen (GUI, for example) that accepts an input of information for creating an integrated LPAR and an instruction of creation of the integrated LPAR. FIG. 15 shows an example for obtaining the characteristics of a load on an integrated LPAR (specifically, characteristics of I/O from and to VOL provided in integrated LPAR) as the information for creating an integrated LPAR. In the present embodiment, to determine the characteristics of a load on an integrated LPAR, inputs of the APP name and the APP intended use of an APP activated in the integrated LPAR are accepted. Further, inputs of the intended use of a VOL provided in the integrated LPAR (server LPAR contained in integrated LPAR), the size of the integrated LPAR to be created, the type of environment (actual or development environment) to which the integrated LPAR belongs, and other pieces of information may be accepted. Moreover, for example, information itself on the I/O characteristics of an application that uses the integrated LPAR, for example, an input of the I/O size may be accepted.

The integrated LPAR creation screen 141 includes, for example, an integrated LPAR ID input UI 1501, an APP selection UI 1502, an APP intended use selection UI 1503, an environment selection UI 1504, an integrated LPAR size selection UI 1505, a resource allocation method selection UI 1506, and a creation instruction UI 1507. The integrated LPAR creation screen 141 may further include a VOL intended use selection UI 1508.

The UI 1501 is a UI to which the ID of an integrated LPAR to be created is inputted and is, for example, a text input field. The UI 1502 is a UI that accepts selection of the APP name and is, for example, a plurality of radio buttons corresponding to a plurality of APP names. The UI 1503 is a UI that accepts selection of the APP intended use and is, for example, a plurality of radio buttons corresponding to a plurality of APP intended uses. The UI 1504 is a UI that accepts selection of the environment and is, for example, a plurality of radio buttons corresponding to a plurality of environments. The UI 1505 is a UI that accepts selection of the integrated LPAR size and is, for example, a plurality of radio buttons corresponding to a plurality of integrated LPAR sizes. The UI 1508 is a UI that accepts selection of the VOL intended use and is, for example, a plurality of check boxes corresponding to a plurality of Vol intended uses. That is, two or more VOL intended uses can be selected. The UI 1506 is a UI that accepts selection of the resource allocation method and is, for example, a plurality of radio buttons corresponding to a plurality of resource allocation methods. The term "Statically exclusive" means that exclusive allocation of a resource is maintained irrespective of the operation status of a server LPAR (start and stop, for example) and other factors. The term "Dynamically exclusive" means that a resource is exclusively allocated only when a server LPAR is in operation and the resource may not be exclusively used when the server LPAR is not in operation. The term "Commonly used" means that a resource may be always commonly allocated.

An integrated LPAR ID is inputted to the UI 1501, an APP, an APP intended use, an environment, an integrated LPAR size, a resource allocation method, and a VOL intended use are selected via the UIs 1502 to 1506 and 1508, and the creation instruction 1507 is operated ("creation" button is pressed, for example). An integrated LPAR is thus created.

The storage partition creation screen 142 and the integrated LPAR creation screen 141 have been described above. The choice of options displayed on the screen 141 or 142 (for example, storage partition size, APP, environment name, APP intended use, and integrated LPAR size) may be added, changed, or deleted as appropriate. Further, regarding the integrated LPAR creation screen 162 displayed on the APP management server 160, the APP displayed in the APP selection UI may be limited to APPs to be managed by the APP management server 160.

Processes carried out in the first embodiment will next be described.

Figure 16:
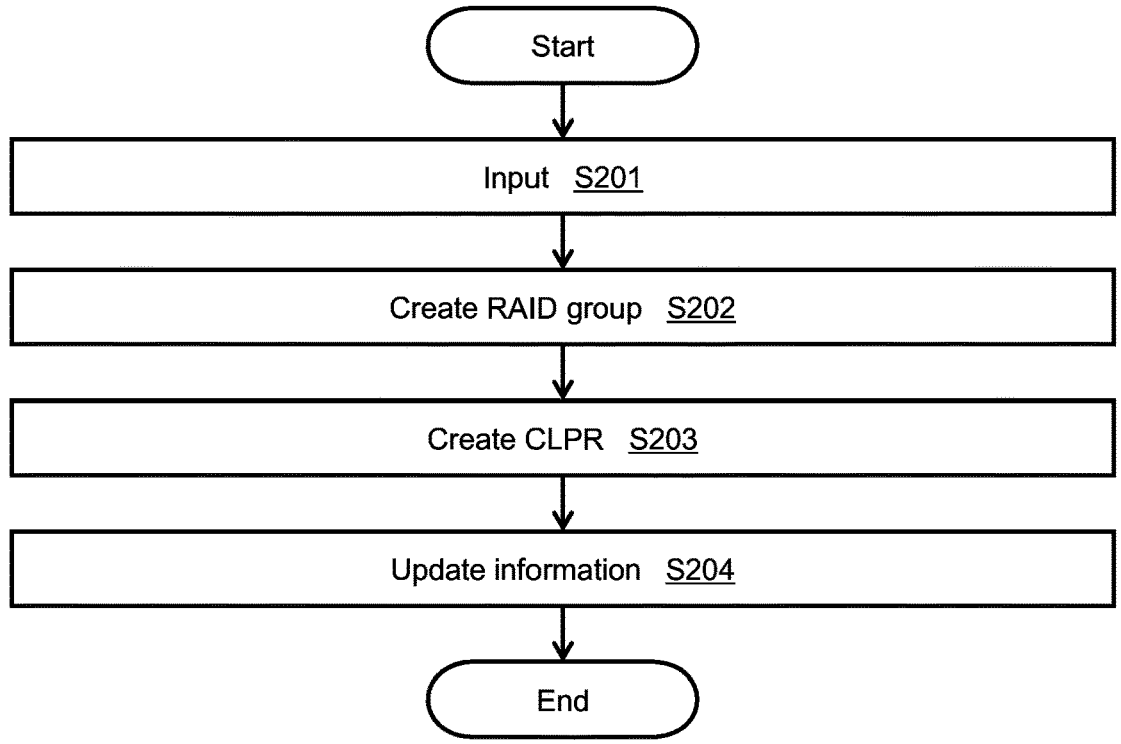
FIG. 16 shows an example of the procedure of a storage partition creation process.

FIG. 16 shows an example of the procedure of a storage partition creation process.

In step 201, the integration management program 660 displays the storage partition creation screen 142 and accepts inputs (selection) of the storage partition ID, the environment name, and the storage partition size and a storage partition creation instruction from the system manager via the screen 142. In response to the storage partition creation instruction, step S202 and the following steps are carried out. A storage partition corresponding to the inputted storage partition ID is called a "target storage partition" in the description of FIG. 16.

In step 202, the integration management program 660 transmits a RAID group creation instruction to the corresponding storage 120. The RAID group creation instruction contains information inputted via the screen 142 (for example, the number of drives corresponding to the selected storage partition size). As a result, the storage 120, in response to the creation instruction, creates a RAID group formed of drives the number of which is related to the creation instruction. The RAID level of the RAID group may be a pre-specified RAID level. In a case where different types of drive 125 are present (in a case where HDDs and SSDs are both present, for example), a RAID group formed of drives of the same type (RAID group formed of HDDs or RAID group formed of SSDs, for example) may be created. Further, a pool based on the created RAID group may also be created.

In step 203, the integration management program 660 transmits a CLPR creation instruction to the storage 120. The CLAR creation instruction contains information inputted via the screen 142 (for example, memory capacity corresponding to selected storage partition size). The storage 120, in response to the creation instruction, creates CLPR having the memory capacity related to the creation instruction. In the case where different types of drive 125 are present (in the case where HDDs and SSDs are both present, for example), the CLPR may be created on a drive type basis.

In step 204, the integration management program 660 updates the storage partition table 155 on the basis of the information inputted via the screen 142 and the information on the created RAID group and CLPR. For example, the IDs of the storage HBA 121, the CPU 123, the CLPAR, and the drive 125 determined by the storage 120, for example, in accordance with the number of HBAs, the number of CPUs, the memory capacity, and the number of drives corresponding to the selected storage partition size are transmitted from the storage 120 to the integration management program 660, and the integration management program 660 registers the IDs, the inputted storage partition ID, and the inputted environment name (actual or development) in the entries corresponding to the targets storage partition (entries in storage partition table 155).

The storage HBA 121 and the CPU 123 may be determined in S202, S203, or any other step. For example, the integration management program 660 may transmit an instruction related to the number of HBAs and the number of CPUs corresponding to the selected storage partition size (for example, RAID group creation instruction, CLPR creation instruction, or any other instruction) to the storage 120. In response to the instruction, the storage 120 may determine the storage HBA 121 and the CPU 123 to be contained in the target storage partition in accordance with the number of HBAs and the number of CPUs related to the instruction.

The storage partition creation process described above may be carried out in an integrated LPAR creation process. In the present embodiment, however, the storage partition creation process is carried out before the integrated LPAR creation process. In other words, after the storage partition creation process, the integrated LPAR creation process starts. In the storage partition creation process, a large load process accompanied by data transfer between drives 125 is required in some cases, and when an attempt to create a storage partition is made in the integrated LPAR creation process, a long time is likely to be required from the start of the integrated LPAR creation process to the end thereof. It can therefore be expected that the time required for the integrated LPAR creation process is shortened by carrying out the storage partition creation process first.

Figure 17:
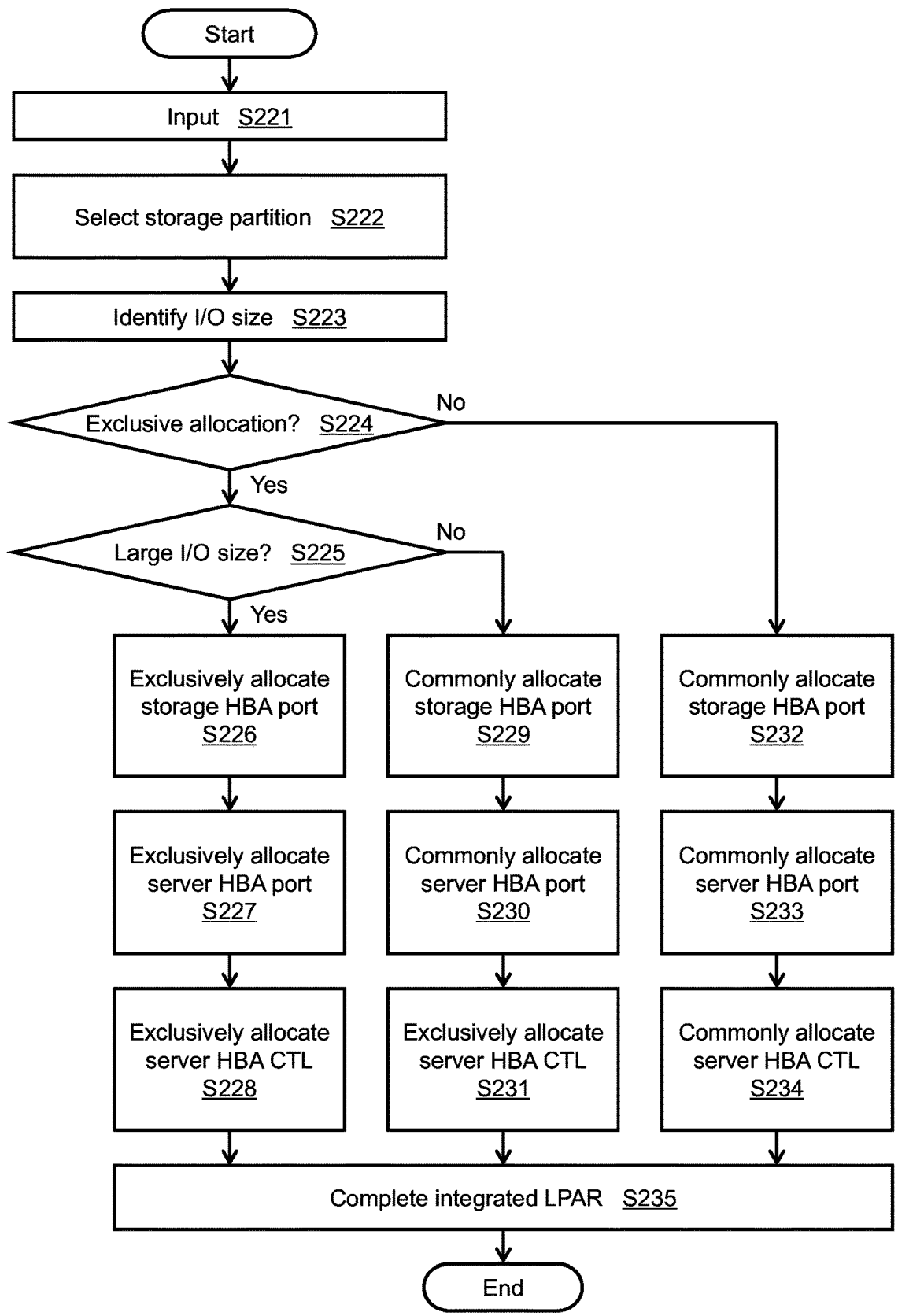
FIG. 17 shows an example of the procedure of an integrated LPAR creation process.

FIG. 17 shows an example of the procedure of the integrated LPAR creation process.

In step 221, the integration management program 660 accepts inputs (selection) of the storage partition ID, the environment name, the APP name, the APP intended use, the VOL intended use, the integrated LPAR size, and the resource allocation method and an integrated LPAR creation instruction from the system manager (or APP manager) via the integrated LPAR creation screen 141 (or 162). In response to the integrated LPAR creation instruction, step 222 and the following steps are carried out. An integrated LPAR corresponding to the inputted integrated LPAR ID is called a "target integrated LPAR" in the description of FIG. 17.

In step 222, the integration management program 660 refers to the storage partition table 155 and selects a storage partition corresponding to the environment selected in step 221.

In step 223, the integration management program 660 refers to the I/O size table 145 and identifies an I/O size corresponding to the APP, the APP intended use, and the VOL intended use selected in step 221. Further, in step 223, the integration management program 660 may refer to the VOL template table 148 and identify a VOL intended use, VOL capacity, and the number of VOLs corresponding to the APP, the APP intended use, and the integrated LPAR size selected in step 221. The integration management program 660 then may create VOLs according to the specified number of VOLs and VOL capacity on the basis of the storage partition selected in step 222 and allocate the created VOLs to a target integrated LPAR in which the APP selected in step 221 is carried out. In a case where a plurality of VOL intended uses identified from the APP name and the APP intended use are present, the VOL capacity and the number of VOLs specified in each of the VOL intended uses may be created and allocated to a target integrated LPAR.

In step 224, the integration management program 660 determines whether or not the selected resource allocation policy is exclusive allocation ("statically exclusive" or "dynamically exclusive"). When a result of the determination is affirmative (Yes in step 224), step 225 is carried out. When a result of the determination is negative (No in step 224), step 232 is carried out. The step 224 is carried out in a case where an input to 1506 has been received.

In step 225, the integration management program 660 determines whether or not the I/O size specified in step 223 is "large." When a result of the determination is affirmative (Yes in step 225), step 226 is carried out. When a result of the determination is negative (No in step 225), step 229 is carried out. In a case where a VOL related to a "large" I/O size and a VOL related to a "small" I/O size are both present (VOL-c and VOL-d in FIG. 2, for example), the integration management program 660 carries out step 226 for the VOL related to a "large" I/O size and carries out step 229 for the VOL related to a "small" I/O size.

In step 226, the integration management program 660 exclusively allocates a storage HBA port 122 to the target integrated LPAR. Specifically, for example, the following processes are carried out.

(226-1) The integration management program 660 refers to the integrated LPAR size template table 147 and identifies the number of HBA ports 506 corresponding to the integrated LPAR size selected in step 221 and the "large" I/O size.

(226-2) Until storage HBA ports 122 the number of which is equal to the identified number of HBA ports 506 are allocated, the following processes (226-2-1) and (226-2-2) are repeated.

(226-2-1) The integration management program 660 refers to the storage HBA table 153 and identifies a storage HBA port that satisfies that the port allocation 1104 is "no allocation," the I/O size 1105 is "large" (or "no allocation"), the allocation destination 1106 is "no allocation," and the environment 1107 is the same as the environment selected in step 221.

(226-2-2) The integration management program 660 exclusively allocates the identified storage HBA port to the target integrated LPAR. Specifically, for example, the integration management program 660 updates the port allocation 1104 to "exclusively used" and updates the allocation destination 1106 to the integrated LPAR ID inputted in step 221 for the entries corresponding to the identified storage HBA port (entries in storage HBA table 153).

In step 227, the integration management program 660 exclusively allocates a server HBA port 108 to the target integrated LPAR. Specifically, for example, the following processes are carried out:

(227-1) The integration management program 660 refers to the server/storage coupling table 154 and identifies a server HBA port 108 coupled to the storage HBA port 122 allocated in step 226.

(227-2) The integration management program 660 exclusively allocates the identified server HBA port 108 to the target integrated LPAR. Specifically, for example, the integration management program 660 updates the port allocation 1104 to "exclusively used," updates the I/O size 1007 to "large," and updates the allocation destination 1008 to the integrated LPAR ID inputted in step 221 for the entries corresponding to the identified server HBA port 108 (entries in server HBA table 152).

In the present embodiment, the correspondence between the server HBA ports 108 and the storage HBA ports 122 is 1:1. Instead, when the servers 100 and the storages 120 may be coupled to each other via switches, the correspondence between the server HBA ports 108 and the storage HBA ports 122 may be 1:n, m:1, or m:n (n and m are each an integer equal to 2 or larger). In a case where a plurality of server HBA ports 108 are coupled to one storage HBA port 122, the integration management program 660 refers to the server HBA table 152 and allocates a server HBA port 108 that satisfies that the port allocation 1004 is "no allocation" and the environment 1009 is the same as the environment selected in step 221 to the target integrated LPAR. The process described above allows the allocated server HBA port 108 to vary in accordance with a selected environment. That is, the server HBA ports 108 can be classified in accordance with the environment. In a case where no appropriate server HBA port 108 is present, the integration management program 660 may return to step 226 and select another storage HBA port 122.

In step 228, the integration management program 660 exclusively allocates a server HBA CTL 107 to the target integrated LPAR. Specifically, for example, the following processes are carried out:

(228-1) The integration management program 660 refers to the server HBA table 152 and identifies a server HBA CTL 107 coupled to the server HBA port 108 exclusively allocated in step 227.

(228-2) The integration management program 660 exclusively allocates the identified server HBA CTL 107 to the target integrated LPAR. Specifically, for example, the integration management program 660 updates the CTL allocation 1006 to "exclusively used," updates the I/O size 1007 to "large," and updates the allocation destination 1008 to the integrated LPAR ID inputted in step 221 for the entries corresponding to the identified server HBA CTL 107 (entries in server HBA table 152).

In step 229, the integration management program 660 commonly allocates a storage HBA port 122 to the target integrated LPAR. Specifically, for example, the following processes are carried out:

(229-1) The integration management program 660 refers to the integrated LPAR size template table 147 and identifies the number of HBA ports 506 corresponding to the integrated LPAR size selected in step 221 and the "small" I/O size.

(229-2) Until storage HBA ports 122 the number of which is equal to the identified number of HBA ports 506 are allocated, the following processes (229-2-1) and (229-2-2) are repeated.

(229-2-1) The integration management program 660 refers to the storage HBA table 153 and identifies a storage HBA port that satisfies that the port allocation 1104 is "commonly used" or "no allocation,") the I/O size 1105 is "small" (or "no allocation"), the allocation destination 1106 is "no allocation," and the environment 1107 is the same as the environment selected in step 221.

(229-2-2) The integration management program 660 commonly allocates the identified storage HBA port to the target integrated LPAR. Specifically, for example, the integration management program 660 updates the port allocation 1104 to "commonly used" and updates the allocation destination 1106 to the integrated LPAR ID inputted in step 221 for the entries corresponding to the identified storage HBA port (entries in storage HBA table 153).

In step 230, the integration management program 660 commonly allocates a server HBA port 108 to the target integrated LPAR. Specifically, for example, the following processes are carried out:

(230-1) The integration management program 660 refers to the server/storage coupling table 154 and identifies a server HBA port 108 coupled to the storage HBA port 122 allocated in step 226.

(230-2) The integration management program 660 exclusively allocates the identified server HBA port 108 to the target integrated LPAR. Specifically, for example, the integration management program 660 updates the port allocation 1104 to "commonly used," updates the I/O size 1007 to "small," and updates the allocation destination 1008 to the integrated LPAR ID inputted in step 221 for the entries corresponding to the identified server HBA port 108 (entries in server HBA table 152).

A plurality of server HBA ports 108 may be coupled to one storage HBA port 122, as described above. In this case, the integration management program 660 refers to the server HBA table 152 and allocates a server HBA port 108 that satisfies that the port allocation 1004 is "commonly used" or "no allocation" and the environment 1009 is the same as the environment selected in step 221 to the target integrated LPAR.

In step 231, the same processes as those in step 228 are carried out. In step 231, however, the I/O size 1007 corresponding to an allocated server HBA CTL 107 is updated to "small."

In step 232, the integration management program 660 commonly allocates a storage HBA port 122 to the target integrated LPAR. Details processes carried out in step 232 are the same as those in step 229.

In step 233, the integration management program 660 commonly allocates a server HBA port 108 to the target integrated LPAR. Details processes carried out in step 233 are the same as those in step 230.

In step 234, the integration management program 660 commonly allocates a server HBA CTL 107 to the target integrated LPAR. Specifically, for example, the following processes are carried out:

(234-1) The integration management program 660 refers to the server HBA table 152 and identifies a server HBA CTL 107 which is coupled to the server HBA port 108 commonly allocated in step 233 and which satisfies that the CTL allocation is "commonly used" or "no allocation."

(234-2) The integration management program 660 commonly allocates the identified server HBA CTL 107 to the target integrated LPAR. Specifically, for example, the integration management program 660 updates the port allocation 1104 to "commonly used," updates the I/O size 1007 to the I/O size identified in step 223, and updates the allocation destination 1008 to the integrated LPAR ID inputted in step 221 for the entries corresponding to the identified server HBA port 108 (entries in server HBA table 152).

In step 235, the integration management program 660 completes the integrated LPAR. Specifically, for example, the following processes are carried out:

(235-1) The integration management program 660 refers to the storage partition selected in step 222 and the storage partition table 155 and identifies CPUs, memories, and drives that belong to the storage partition. The integration management program 660 instructs creation of VOLs based on the VOL capacity and the number of VOLs identified in step 223 and issues an instruction to cause the storage 120 to use the CPUs, the memories, and the drives that belong to the storage partition.

(235-2) The storage 120 creates the instructed number of VOLs each having the instructed capacity on the instructed drives in the storage partition instructed in step 235-1. The storage 120 configures the instructed CPUs and memories to be used to access to the created VOLs.

(235-3) The integration management program 660 instructs the storage 120 to allocate the storage HBAs allocated in steps 226, 229, and 232.

(235-4) The storage 120 configures the VOLs created in step 235-2 to be accessed only from the storage HBAs instructed in step 235-3. The configuration can prevent the other storage HBAs from accessing the VOLs. It is assumed that resources containing CPUs, memories, and storage HBA ports present in advance at least in the storage system are stored in and managed by the integration management server, and that whether the CPUs, memories, and storage HBA ports have been allocated on a resource basis is also managed.

(235-5) The integration management program 660 refers to the integrated LPAR size template table 147 and identifies the number of LPAR CPU cores 502, the LPAR memory capacity 503, and the number of LPAR NIC ports 504 corresponding to the integrated LPAR size selected in step 221.

(235-6) The integration management program 660 instructs the server 100 to create a server LPAR 101 on the basis of CPU cores (cores of CPUs 102) the number of which is equal to the identified number of CPU cores, a memory 103 the total capacity of which is equal to the identified LPAR memory capacity 503, NIC ports the number of which is equal to the identified number of LPAR NIC ports 504, and the server HBA ports 108 and the server HBA CTLs 107 allocated in steps 226 to 234.

(235-7) The server 100 allocates the CPU cores, the memories, the NIC ports, the server HBA ports, and the server HBA CTLs in accordance with the instruction in step 235-2. It is assumed that resources containing the number of CPU cores, memory capacity, NIC ports, server HBA ports, server HBA CTLs present in advance at least in the storage system are stored in and managed by the integration management server, and that whether the number of CPU cores, the memory capacity, the NIC ports, the server HBA ports, the server HBA CTLs have been allocated on a resource basis is also managed. Since the resources exclusively allocated in step 235-3 are so configured not to be allocated in the other server LPARs 101 and further so configured not to be accessed from any APPs on the other server LPARs 101, the resources are not used by the other server LPARs 101.

(235-8) The integration management program 660 reflects the configuration of the created server LPAR 101 (information on allocated resources) in the integrated LPAR table 149, the server LPAR table 150, and the server LPAR/HBA table 151.

An example of the procedure of the integrated LPAR creation process has been described. The process determines in the series of procedure whether the resources in both the server and storage are exclusively or commonly used in accordance with the I/O characteristics of an activated APP to form a logical partition. In the integrated LPAR creation process, allocated resources only need to be determined, and the order of the steps is not limited to the order shown in the present embodiment. It is, however, necessary to consider the state of coupling to a resource having been already configured. Specifically, a storage HBA related to a "small" I/O size is allocated to a server LPAR 101 in which an APP related to a "small" I/O size operates. Further, a server LPAR 101 so configured that the environment is specified to be an actual environment uses only resources that belong to an actual storage partition. Further, in a case where resources sufficient for a request cannot be secured, for example, in a case where no integrated LPAR can be created because no unallocated resource is present, an unallocated resource may be prepared by integrated LPAR migration in a second embodiment, and then an integrated LPAR may be created. Instead, a user may be advised of common allocation in place of exclusive allocation, and a message stating that no integrated LPAR can be created due to insufficient resources may be displayed.

Further, the integrated LPAR table 149 may be created from the I/O size table 145, the allocation policy table 146, the integrated LPAR size template table 147, the server LPAR table 150, the server LPAR/HBA table 151, the server HBA table 152, the storage HBA table 153, and the storage partition table 155. For the sake of the management afterward, the integration management program 660 may display the allocation type (exclusive or common use) on a resource basis on the basis of at least one of the tables described above (for example, server LPAR/HBA table 151, server HBA table 152, and storage HBA table 153). Specifically, for example, the allocation type may be displayed on a resource basis on a management screen, such as the screen described in a third embodiment (FIG. 23).

According to the first embodiment, the portion that forms the server storage system 1000 and includes the server 100 and the storage 120 is logically divided into the actual system and the development system. As a result, a load on the development system does not adversely affect the performance of the actual system.

Further, according to the first embodiment, at least in the actual system, whether a resource is exclusively or commonly allocated to an integrated LPAR is determined on the basis of the characteristics of a load on a VOL with which the integrated LPAR is provided and the type of the resource to be allocated. Specifically, for example, resources in the portion from a server LPAR 101 to a storage HBA 122 are divided and allocated to a VOL related to a "large" I/O size and a VOL related to a "small" I/O size, resources in the portion from a server LPAR 101 to a storage HBA port 122 are divided and allocated to VOLs related to "large" I/O sizes, and resources in the portion from a server LPAR 101 to a server HBA CTL 107 are divided and allocated to VOLs related to "small" I/O sizes. The configuration described above allows exclusive allocation of a specific resource in a portion on which a load acts in consideration of the I/O characteristics of an APP (application) that operates in an integrated LPAR (logical partition), whereby improvement in the degree of APP aggregation and prevention of performance degradation can be achieved. In the first embodiment, the load characteristics are uniquely determined from the combination of at least the APP intended use and the VOL intended use out of the APP name, the APP intended use, and the VOL intended use. However, in place of at least one of the APP name, the APP intended use, and the VOL intended use, another element (input of I/O characteristics themselves, for example) may be used to identify the I/O characteristics.

According to FIG. 2, for example, both in the logical division of the portion including the server 100 and the storage 120 and the logical division based on at least one of the I/O characteristic, the APP intended use, and other factors (logical division of actual system, for example), a plurality of types of resource corresponding to a plurality of continuous tiers are logically divided (allocation control). In the logical division, however, the plurality of tiers are not necessarily continuous in an exact sense. For example, even when first and second resources are logically dividable resources, a third resource between the first and second resources in a tiered structure is a logically undividable resource in some cases. In this case, in the logical division of resources from an upper level to a lower level, a middle resource is not logically divided. It can, however, be said that such a case is also logical division of resources from an upper level to a lower level (logical division of portion from server 100 to storage 120, for example). Whether a resource is a logically dividable resource or not may depend on at least one of the type of the resource and the function of the storage 120.

Second Embodiment

A second embodiment will be described. In the description, differences from the first embodiment will be primarily described, and points common to the first embodiment will not be described or will be described in a simplified manner.

In the second embodiment, an integrated LPAR can be copied and/or migrated. The server or the storage to which the integrated LPAR is copied or migrated may or may not be the server or the storage from which the integrated LPAR is copied or migrated.

Figure 18:
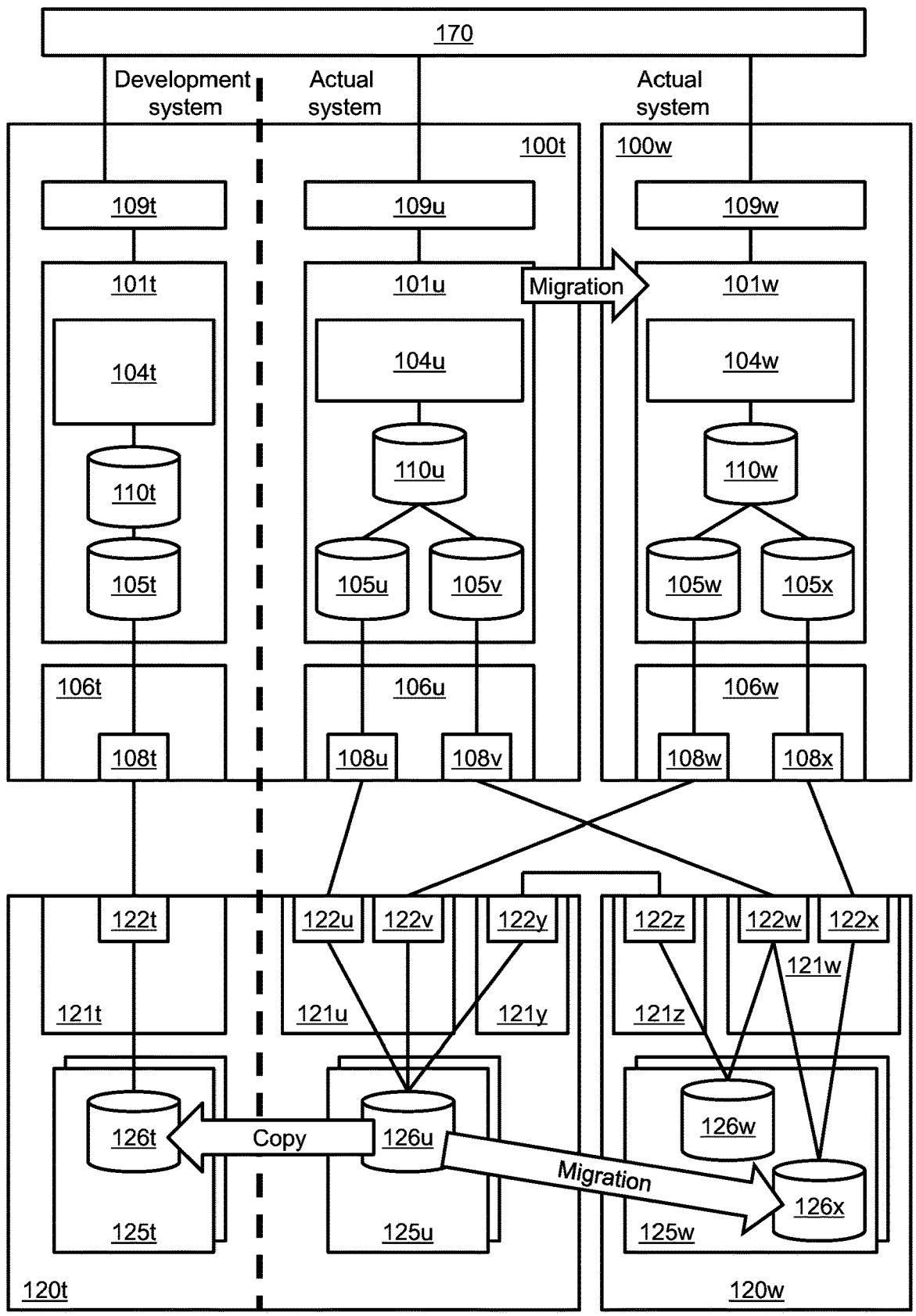
FIG. 18 shows an example of copy and migration of an integrated LPAR according to a second embodiment.

FIG. 18 shows an example of copy and migration of an integrated LPAR. In the following description, a VOL recognized by a server LPAR 101 is called a server VOL 10, and a VOL provided by a storage 120 is called a storage VOL. The server VOL corresponds to the storage VOL. The storage VOL may be a virtual VOL to which a storage area is allocated from a pool based on a drive 125.

A plurality of servers 100 include, for example, a first server 100*t* and a second server 100*w*. The first server 100*t* and the second server 100*w* can communicate with each other via a switch 170. A plurality of storages 120 include, for example, a first storage 120*t* and a second storage 120*w*. The first server 100*t* and the first storage 120*t* are logically divided over the portion including the servers 100 and the storages 120, and a development system and an actual system are therefore provided. The second server 100*w* and the second storage 120*w* belong to the actual system. That is, the actual system includes part of the first server 100*t*, part of the first storage 120*t*, the second server 100*w*, and the second storage 120*w*. In the actual system, part of the first server 100*t* and the second server 100*w* are each coupled to both part of the first storage 120*t* and the second storage 120*w*.

VOLs 110 are VOLs managed by a multipath program (not shown) on the server LPARs 101. The multipath program has the function of putting a plurality of VOLs 105, which can refer to one VOL 126 on a storage 120 via a plurality of paths, together into one VOL 110. For example, a VOL 110*u* is a VOL formed of VOLs 105*u* and 105*v* put together.

The VOL 105*u* refers to a VOL 126*u* via a port 108*u* and a port 122*u*. A VOL 126*w* is a virtual VOL that refers the VOL 126*u* via a port 122*z* and a port 122*y*. The VOL 105*v* refers to the VOL 126*w* via a port 108*v* and a port 122*w*. The VOL 105*u* and the VOL 105*v* can therefore refer to the same VOL 126*u*.

The switch 170 is a switch that couples NICs 109 to each other. A server LPAR 101 can communicate with another server LPAR 101 via NICs 109 and the switch 170.

An "integrated LPAR copy process" is the process of copying the VOL 126*u* to another environment in the same storage 120 to allow a VOL 126*t*, which is a copy of the VOL 126*u*, to be used. An "integrated LPAR migration process" is the process of migrating data in the VOL 126*u* into a VOL 126*x* in the storage 120*w*, which is another storage, to allow the VOL 126*x*, which is the migration destination, to be used.

Figure 19:
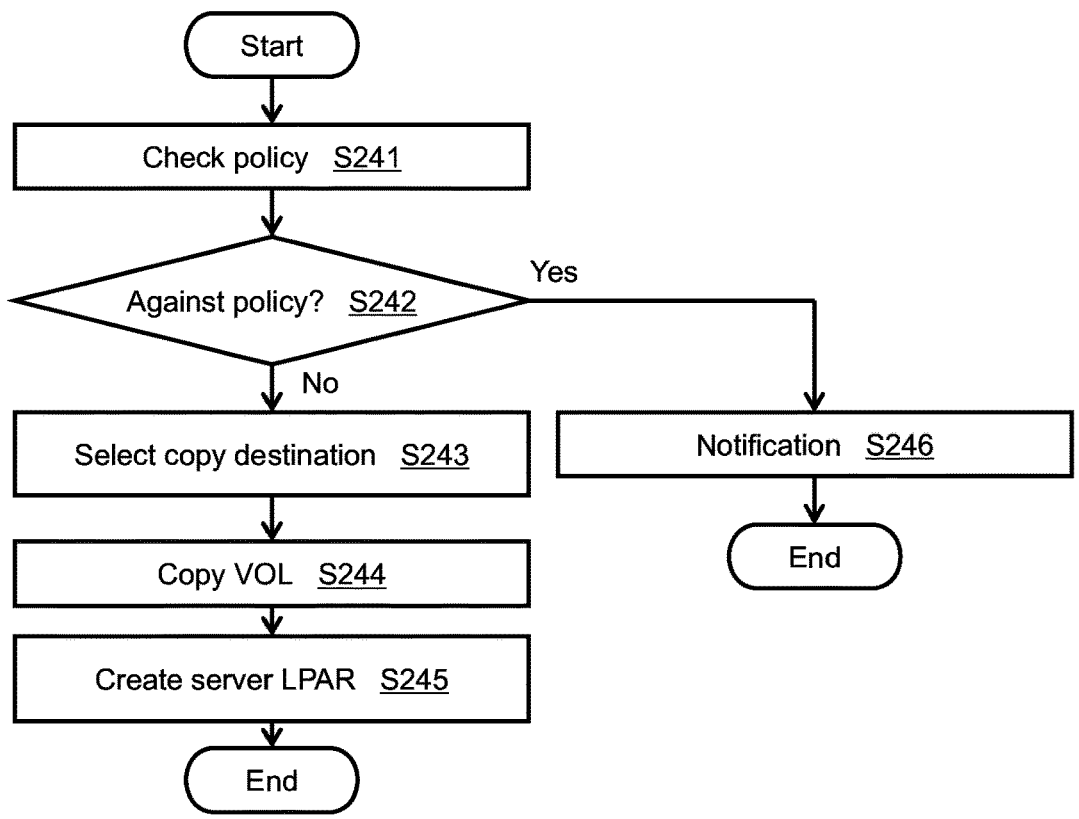
FIG. 19 shows an example of the procedure of an integrated LPAR copy process.

FIG. 19 shows an example of the procedure of the integrated LPAR copy process.

Before carrying out the integrated LPAR copy process, the integration management program 660 receives, from the system manager, a result of selection of an integrated LPAR to be copied and a result of selection of an environment at a copy destination.

In step 241, the integration management program 660 refers to the allocation policy table 146. In step 242, the integration management program 660 determines whether or not the allocation state of the integrated LPAR to be copied has not been changed but satisfies the allocation policy. Specifically, for example, the integration management program 660 determines whether or not the allocation state of the port 108, the CTL 107, and the port 122 allocated to the integrated LPAR to be copied satisfies the allocation policy indicated by the table 146 on the basis of the integrated LPAR table 149, the I/O size table 145, the allocation policy table 146, the server LPAR/HBA table 151, the server HBA table 152, and the storage HBA table 153.

Any integrated LPAR typically satisfies the allocation policy because each integrated LPAR is created on the basis of the allocation policy table 146. However, the system manager or a person different from the system manager (person who maintains server storage system, for example) changes in some cases the allocation of a resource in an integrated LPAR via the integration management server 140 or another terminal (SVP (Service Processor) (not shown) coupled to storage 120, for example) for error elimination or any other purpose. In this case, the resource is allocated without awareness of the allocation policy. The allocation state of the integrated LPAR may therefore not satisfy the allocation policy in some cases. In consideration of such a situation, in the present embodiment, it is evaluated in the integrated LPAR copy (or migration) process whether or not the allocation state of the integrated LPAR satisfies the allocation policy.

In a case where a result of the determination in step 242 is affirmative (No in S242), step 243 is carried out. In a case where a result of the determination in step 242 is negative, step 246 is carried out. Instead, steps 241 and 242 may be omitted, and the following steps (step 243 and following steps) may be carried out without confirmation of the policy.

In step 243, the integration management program 660 checks if unallocated resources are present in the copy destination environment and determines resources to be used. In detail, as in the procedure of the resource allocation process in the integrated LPAR creation process in FIG. 17, the resources are determined in accordance with the policy for the storage HBA port 122, the server HBA port 108, the server HBA CTL 107, the server CPU 102, the memory 103, and the NIC 109.

In step 244, the integration management program 660 instructs storage 120 to copy a VOL. In the instruction, a predetermined copy speed may be specified. The reason for this is that the copy load should not influence the performance of other server LPARs 101. In response to the instruction, inter-VOL data copy is performed at the specified copy speed or lower.

In step 245, the integration management program 660 creates a server LPAR 101. Specifically, for example, the integration management program 660 uses the resources determined in step 243 and uses the VOL copied in step 244 to create a server LPAR 101 having the same integrated LPAR size as that of the copy source on the basis of the integrated LPAR size template table 147.

In step 246, the integration management program 660 notifies the system manager that the configuration of the integrated LPAR has been changed. In place of the notification to the system manager, the configuration of the LPAR to be copied (resource allocation) may be automatically changed in such a way that the allocation policy is satisfied.

Figure 20:
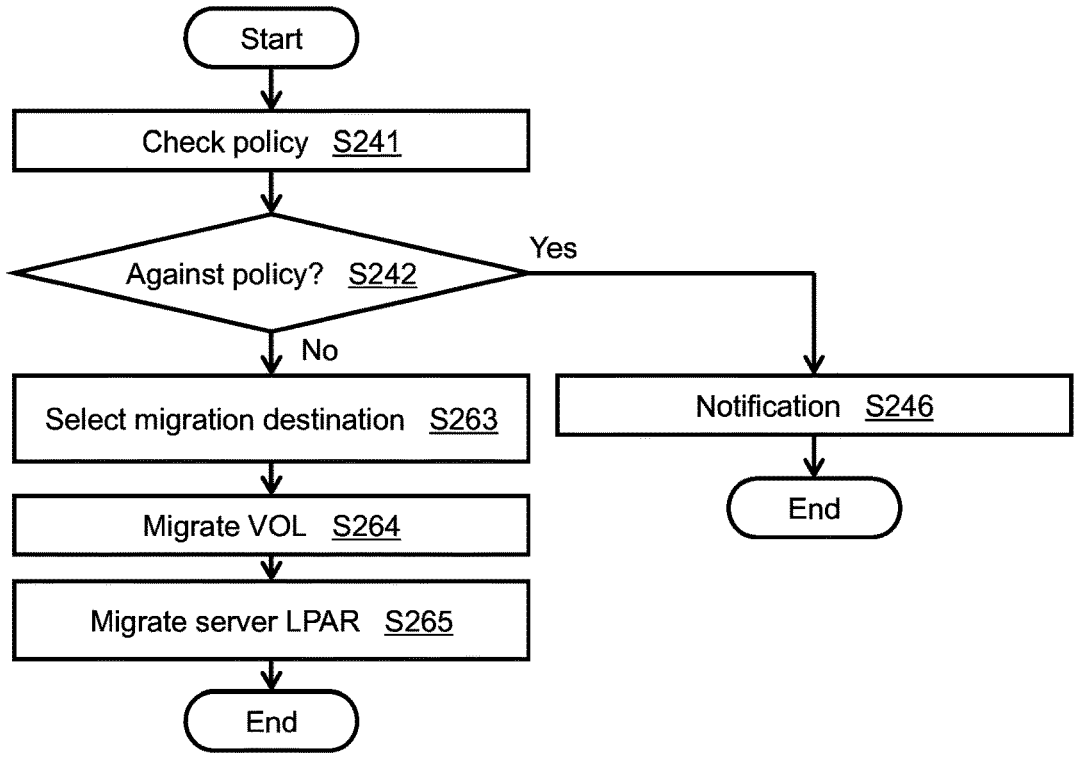
FIG. 20 shows an example of the procedure of an integrated LPAR migration process.

FIG. 20 shows an example of the procedure of the integrated LPAR migration process.

Before carrying out the integrated LPAR migration process, the integration management program 660 receives, from the system manager, a result of selection of an integrated LPAR to be migrated and a result of selection of an environment at a movement destination.

The processes in steps 241, S242 and S246 are the same as those in FIG. 19.

In step 263, the integration management program 660 checks if unallocated resources are present in the movement destination environment and determines resources to be used. In detail, as in the procedure of the resource allocation process in the integrated LPAR creation process in FIG. 17, the resource are determined in accordance with the policy for the storage HBA port 122, the server HBA port 108, the server HBA CTL 107, the server CPU 102, the memory 103, and the NIC 109.

In S264, the integration management program 660 instructs the server 100 and the storage 120 to migrate a VOL.

Now, consider a case where the server LPAR 101*u* and the VOL 126*u* in the actual system are migrated to the server 100*w* and the storage 120*w* in the actual system. It is assumed that access to the VOL 126*u* is performed via the path using the VOL 105*u* before the movement.

The integration management program 660 configures the VOL 126w to refer to the VOL 126u. After the configuration is completed, the integration management program 660 adds the path using the VOL 105v to the VOL 110u. After the path is added, the integration management program 660 deletes the path using the VOL 105u. After the path is deleted, the integration management program 660 copies the content of the VOL 126u to the VOL 126x. The copy is performed at a predetermined copy speed that does not cause the copy load to influence the performance of other server LPARs 101. After the copy is completed, the integration management program 660 switches the source to which the VOL 105v refers from the VOL 126w to the VOL 126x.

In step 265, the integration management program 660 instructs the server 100 to migrate the server LPAR. Specifically, for example, the integration management program 660 uses the resources determined in step 263 and uses the VOL copied in step 263 to create a server LPAR 101 having the same integrated LPAR size as that of the copy source on the basis of the integrated LPAR size template table 147. At this point, the integration management program 660 copies the content of the memory 103 in the server LPAR 101u to the server LPAR 101w, and after the copy is completed, the integration management program 660 deletes the server LPAR 101u.

According to the second embodiment, at the destination to which an integrated LPAR is copied or the destination to which an integrated LPAR is migrated, the allocation of resources in the integrated LPAR (resource allocation according to allocation policy) can be taken over. Therefore, when an integrated LPAR is copied or migrated, both the improvement in the degree of APP aggregation and prevention of performance degradation can be maintained. In the second embodiment, the integrated LPAR relocation between different environments in the same server 100 and the same storage 120 is integrated LPAR copy, but not necessarily, and may be integrated LPAR migration. Similarly, integrated LPAR relocation between different servers 100 and different storages 120 in the same environment is integrated LPAR migration, but not necessarily, and may be integrated LPAR copy.

Third Embodiment

A third embodiment will be described. In the description, differences from the first and second embodiments will be primarily described, and points common to the first and second embodiments will not be described or will be described in a simplified manner.

The integration management program 660 repeatedly (regularly, for example) collects a metric value of each resource in the server storage system 1000 and registers the metric values on a resource basis in the management information 670. The integration management program 660 can display a monitoring result screen representing a monitoring result formed of the registered metric values merged on a resource basis with at least one of the tables 145 to 155 in the management information 670.

FIG. 23 shows an example of the monitoring result screen.

A monitoring result screen 2301 displays a server resource monitoring result and a storage resource monitoring result.

The server resource monitoring result is information formed of the server HBA table 152 merged with the bandwidth use ratio (example of metric value) between a server HBA port 108 and a server HBA CTL 107.

The storage resource monitoring result is information formed of the storage HBA table 153 merged with the bandwidth use rate (example of metric value) of a storage HBA port 122.

The system manager can appropriately manage the resources by looking at the monitoring result screen 2301. For example, in a case where the bandwidth use rate of a storage HBA port 122 exceeds a certain value, and the port 122 is a shared resource, the system manager determines that the port 122 can be further allocated to another integrated LPAR and can perform operate for resource allocation optimization. On the other hand, in a case where the port 122 is an exclusive resource, the system manager can determine that the allocation state of the port 122 should not be changed from the exclusive allocation to the common allocation.

Several embodiments have been described above. The embodiments are presented by way of example for describing the present invention, and it is not intended that the scope of the present invention is limited only to the embodiments. The present invention can be implemented in a variety of other forms. For example, in the embodiments described above, the characteristics of a load on an integrated LPAR are load characteristics expected (predicted) on the basis of an APP intended use and a intended VOL use (I/O characteristics, for example). Instead, load characteristic obtained as actually measured values (I/O characteristics, for example) may be employed.

REFERENCE SIGNS LIST

100: Server, 120: Storage system

The invention claimed is:

1. A computer system comprising a server storage system including a server system and a storage system, wherein:
the server storage system has a plurality of logical partitions obtained by logically dividing at least part of a plurality of resources including a plurality of types of resource,
the plurality of resources include a plurality of server resources including a plurality of types of server resource provided in the server system and a plurality of storage resources including a plurality of types of storage resource provided in the storage system,
a resource allocated to each of two or more logical partitions includes at least one of an exclusively allocated resource and a commonly allocated resource,
a resource exclusively allocated to a logical partition is a resource exclusively used in the logical partition,
a resource commonly allocated to a logical partition is a resource that is allowed to be commonly used by at least two logical partitions including the logical partition,
the type of each of a plurality of resources exclusively allocated to each of the two or more logical partitions varies in accordance with a load characteristic of a load on the logical partition,
an application program that issues an input/output (I/O) request to a logical volume provided by the storage system is executed in each of the two or more logical partitions, and
the load characteristic of each of the two or more logical partitions is a characteristic of the I/O from and to the logical volume with which the logical partition is provided.

2. The computer system according to claim 1,
wherein a resource is allocated to each of the two or more logical partitions in accordance with a resource allocation policy corresponding to the load characteristic of the logical partition out of a plurality of resource allocation policies, and
each of the plurality of resource allocation policies is a policy that defines whether two or more types of resource are each exclusively or commonly allocated.

3. The computer system according to claim 1,
wherein the I/O characteristic of each of the two or more logical partitions includes an I/O size that is a size of I/O-target data that accompanies the I/O request issued in the logical partition.

4. The computer system according to claim 1,
wherein the I/O characteristic of each of the two or more logical partitions includes a characteristic determined based on an input of an intended use of the application program executed in the logical partition and an input of an intended use of the logical volume that is a source and a destination of I/O request issued by the application program.

5. The computer system according to claim 3,
wherein the plurality of server resources include one or more controllers for one or more first interface devices coupled to the storage system and one or more first ports for the one or more first interface devices,
the plurality of storage resources include one or more second interface devices coupled to the server system and one or more second ports for the one or more second interface devices, and
whether at least one of the controllers, the first ports, the second interface devices, and the second ports is exclusively or commonly allocated to each of the two or more logical partitions depends on the I/O size of the logical volume with which the logical partition is provided.

6. The computer system according to claim 5,
wherein different controllers, different first ports, and different second ports are allocated to logical partitions with which two or more logical volumes each related to a large I/O size are provided, and
a commonly allocated second interface devices is commonly used by logical partitions with which logical volumes related to the same I/O size are provided.

7. The computer system according to claim 5,
wherein different controllers and different second interface devices are allocated to a logical partition with which a logical volume related to a large I/O size is provided and a logical partition with which a logical volume related to a small I/O size is provided.

8. The computer system according to claim 5,
wherein different controllers are allocated to two or more logical partitions with which logical volumes each related to a small I/O size are provided, and the first ports, the second ports, and the second interface devices are commonly allocated, and
a commonly allocated second interface device and a commonly allocated second port are commonly used by logical partitions with which logical volumes related to the same I/O size are provided.

9. The computer system according to claim 1,
wherein the server storage system includes a plurality of subsystems obtained by logically dividing a portion including the server system and the storage system,
a first subsystem out of the plurality of subsystems is an actual system that is a subsystem that belongs to an actual environment,
a second subsystem out of the plurality of subsystems is a development system that is a subsystem that belongs to a development environment, and
the actual system includes the two or more logical partitions.

10. The computer system according to claim 9,
wherein at least one of logical partition relocation between different environments in the same server system and the same storage system and logical partition relocation between different server systems and between different storage systems in the same environment is performed, and
a logical partition at a destination of the relocation is so controlled that a resource of each type to be allocated is exclusively or commonly allocated to the logical partition in accordance with a characteristic thereof.

11. The computer system according to claim 1,
further comprising a management system that controls allocation of the resources in the server storage system to the logical partitions,
wherein the management system:
accepts an input of an intended use of the APP executed in each of the two or more logical partitions and an input of an intended use of the logical volume that is a source and a destination of the I/O request issued by the application program, and
the characteristic of I/O from and to the volume is also based on the inputted intended use of the application program and intended use of the volume.

12. The computer system according to claim 1,
further comprising a management system that manages the server storage system,
wherein the management system:
collects metric values of at least part of the plurality of resources, and
displays not only whether the at least part of the resources are exclusively or commonly allocated but also the collected metric values.

13. The computer system according to claim 1, wherein the characteristic of the I/O from and to the volume with which the logical partition is provided includes a frequency of the I/O.

14. The computer system according to claim 1, wherein the characteristic of the I/O from and to the volume with which the logical partition is provided includes a transfer bandwidth of the I/O.

15. The computer system according to claim 13, wherein the characteristic of the I/O from and to the volume with which the logical partition is provided includes a transfer bandwidth of the I/O.

16. A logical partition management method in a management system that manages a server storage system including a server system and a storage system,
wherein the management system includes a control section and a storage section, and
wherein the storage section has policies that relate resource information on a plurality of resources provided in each of the server system and the storage system to whether each of the plurality of resources is exclusively or commonly allocated to a created logical partition in accordance with a characteristic of a load on the resource, and the control section performing the steps of:

receiving an instruction of creation of information on identification of an application program and a logical partition provided for the application program, identifying resources to be allocated to the logical partition and determines whether each of the identified resources is exclusively or commonly allocated based not only on the load characteristic obtained based on the resource information and the identification information but also on the policies, and transmitting an instruction of creation of the logical partition to which the identified resource is allocated based on a result of the determination to the server system and the storage system, wherein the application program issues an input/output (I/O) request to a logical volume provided by the storage system is executed in each of the two or more logical partitions, and wherein the load characteristic of each of the two or more logical partitions is a characteristic of the I/O from and to the logical volume with which the logical partition is provided.

17. The logical partition management method according to claim 16, wherein the control section:

receives an input of an intended use of the application program and an input of an intended use of a volume that is a source and a destination of I/O performed by the application in addition to the information on identification of the application program, and obtains, as the load characteristic, an I/O size that is a size of I/O-target data that accompanies the I/O request issued by the application program based on the input information.

18. The computer system according to claim 16, wherein the characteristic of the I/O from and to the volume with which the logical partition is provided includes a frequency of the I/O.

19. The computer system according to claim 16, wherein the characteristic of the I/O from and to the volume with which the logical partition is provided includes a transfer bandwidth of the I/O.

20. The computer system according to claim 18, wherein the characteristic of the I/O from and to the volume with which the logical partition is provided includes a transfer bandwidth of the I/O.

* * * * *